US012306555B2

(12) United States Patent
Murauchi

(10) Patent No.: US 12,306,555 B2
(45) Date of Patent: May 20, 2025

(54) IMAGE FORMING APPARATUS AND DETERMINATION METHOD

(71) Applicant: Konica Minolta, Inc., Tokyo (JP)

(72) Inventor: Junji Murauchi, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 18/356,796

(22) Filed: Jul. 21, 2023

(65) Prior Publication Data

US 2024/0061360 A1 Feb. 22, 2024

(30) Foreign Application Priority Data

Aug. 19, 2022 (JP) ................................ 2022-131071

(51) Int. Cl.

| | |
|---|---|
| ***G03G 15/08*** | (2006.01) |
| ***G03G 15/00*** | (2006.01) |
| ***G03G 15/10*** | (2006.01) |

(52) U.S. Cl.

CPC ....... *G03G 15/0868* (2013.01); *G03G 15/104* (2013.01); *G03G 15/556* (2013.01); *G03G 2215/00611* (2013.01); *G03G 2215/0695* (2013.01)

(58) Field of Classification Search

CPC ............ G03G 15/556; G03G 15/0849; G03G 15/0856; G03G 15/0877

See application file for complete search history.

(56) References Cited

U.S. PATENT DOCUMENTS

| | | | | |
|---|---|---|---|---|
| 9,423,747 | B1 * | 8/2016 | Ishibashi | G03G 15/0178 |
| 2006/0198644 | A1 * | 9/2006 | Itagaki | G03G 15/5033 399/257 |
| 2006/0263106 | A1 * | 11/2006 | Yamaguchi | G03G 15/0862 399/27 |
| 2007/0065166 | A1 * | 3/2007 | Takiguchi | G03G 15/556 399/35 |
| 2010/0166439 | A1 * | 7/2010 | Nishimura | G03G 15/556 399/29 |
| 2011/0217055 | A1 * | 9/2011 | Takehara | G03G 15/0877 399/49 |
| 2020/0292966 | A1 * | 9/2020 | Umeda | G03G 15/0856 |

FOREIGN PATENT DOCUMENTS

| | | |
|---|---|---|
| JP | 2010-266588 A | 11/2010 |
| JP | 2013-101194 A | 5/2013 |

* cited by examiner

*Primary Examiner* — Jessica L Eley

(74) *Attorney, Agent, or Firm* — LUCAS & MERCANTI, LLP

(57) ABSTRACT

An electrophotographic image forming apparatus includes: a replacement detector that detects that a toner bottle has been replaced; a developer that develops an electrostatic latent image by using a toner supplied from the toner bottle and stored; a fog detector that detects a fog amount; and a determiner that determines whether or not the detected fog amount continuously exceeds a predetermined threshold value in a state where a toner supplied from a toner bottle before replacement and a toner supplied from a toner bottle after replacement are mixed in the developer.

20 Claims, 14 Drawing Sheets

FIG. 9

| ITEM \ CLASSIFICATION | COMPARATIVE EXAMPLE 1 | COMPARATIVE EXAMPLE 2 | COMPARATIVE EXAMPLE 3 | EXAMPLE 1 | EXAMPLE 2 | EXAMPLE 3 | EXAMPLE 4 | EXAMPLE 5 | EXAMPLE 6 |
|---|---|---|---|---|---|---|---|---|---|
| FOG MARGIN | FIXING METHOD | | DETECTION METHOD | SWITCHING METHOD | DETECTION METHOD (UPPER LIMIT RELEASE) | | | | |
| IMAGE FORMING APPARATUS TYPE | A | | | | | | | B | C |
| ORIGINAL TONER | A | | | | | | | | |
| NEW TONER | A | B | | | | | C | B | |
| AVERAGE CW RATIO | 5.0% | | | | | 10.0% | 5.0% | | |
| SUB-HOPPER CAPACITY | 20g | | | | | | | 0g | 30g |
| DEVELOPER DEVELOPING AGENT CAPACITY | 250g | | | | | | | | 650g |
| TARGET Tc | 6.0% | | | | | | | | |
| DEVELOPER TONER AMOUNT | 15g | | | | | | | | 39g |
| CARRIER RATE TR | 10.0% | | | | | | | | |

FIG. 12

| CLASSIFICATION / NUMBER OF SHEETS | COMPARATIVE EXAMPLE 1 | COMPARATIVE EXAMPLE 2 | COMPARATIVE EXAMPLE 3 | EXAMPLE 1 | EXAMPLE 2 | EXAMPLE 3 | EXAMPLE 4 | EXAMPLE 5 | EXAMPLE 6 |
|---|---|---|---|---|---|---|---|---|---|
| 0 | 80 | 80 | 70 | 80 | 70 | 80 | 80 | 80 | 80 |
| 100 | 80 | 80 | 80 | 80 | 80 | 90 | 80 | 88 | 80 |
| 200 | 80 | 80 | 85 | 80 | 85 | 95 | 90 | 93 | 80 |
| 300 | 80 | 80 | 90 | 100 | 90 | 100 | 90 | 100 | 85 |
| 400 | 80 | 80 | 100 | 100 | 100 | 120 | 110 | 120 | 85 |
| 500 | 80 | 80 | 120 | 110 | 120 | 150 | 125 | 150 | 88 |
| 600 | 80 | 80 | 120 | 160 | 150 | 160 | 155 | 160 | 90 |
| 700 | 80 | 80 | 120 | 180 | 150 | 180 | 160 | 180 | 90 |
| 800 | 80 | 80 | 120 | 180 | 160 | 180 | 165 | 180 | 90 |
| 900 | 80 | 80 | 120 | 180 | 160 | 190 | 165 | 190 | 95 |
| 1,000 | 80 | 80 | 120 | 180 | 180 | 190 | 190 | 185 | 100 |
| 2,000 | 80 | 80 | 120 | 180 | 180 | 180 | 190 | 185 | 120 |
| 3,000 | 80 | 80 | 120 | 180 | 180 | 180 | 190 | 180 | 180 |
| 4,000 | 80 | 80 | 120 | 180 | 180 | 170 | 190 | 165 | 180 |
| 5,000 | 80 | 80 | 120 | 160 | 150 | 130 | 160 | 130 | 185 |
| 6,000 | 80 | 80 | 120 | 160 | 150 | 130 | 155 | 125 | 190 |
| 7,000 | 80 | 80 | 120 | 120 | 120 | 100 | 120 | 100 | 190 |
| 8,000 | 80 | 80 | 110 | 110 | 115 | 90 | 120 | 90 | 190 |
| 9,000 | 80 | 80 | 100 | 100 | 103 | 80 | 110 | 80 | 190 |
| 10,000 | 80 | 80 | 80 | 80 | 80 | 80 | 80 | 80 | 180 |
| 20,000 | — | — | — | — | — | — | — | — | 90 |

FIG. 13

| NUMBER OF SHEETS \ CLASSIFICATION | COMPARATIVE EXAMPLE 1 | COMPARATIVE EXAMPLE 2 | COMPARATIVE EXAMPLE 3 | EXAMPLE 1 | EXAMPLE 2 | EXAMPLE 3 | EXAMPLE 4 | EXAMPLE 5 | EXAMPLE 6 |
|---|---|---|---|---|---|---|---|---|---|
| 0 | ○ | ○ | ○ | ○ | ○ | ○ | ○ | ○ | ○ |
| 100 | ○ | ○ | ○ | ○ | ○ | ○ | ○ | ○ | ○ |
| 200 | ○ | ○ | ○ | ○ | ○ | ○ | ○ | ○ | ○ |
| 300 | ○ | △ | ○ | ○ | ○ | ○ | ○ | ○ | ○ |
| 400 | ○ | △ | ○ | ○ | ○ | ○ | ○ | ○ | ○ |
| 500 | ○ | △ | ○ | ○ | ○ | ○ | ○ | ○ | ○ |
| 600 | ○ | × | × | ○ | ○ | ○ | ○ | ○ | ○ |
| 700 | ○ | × | × | ○ | ○ | ○ | ○ | ○ | ○ |
| 800 | ○ | × | × | ○ | ○ | ○ | ○ | ○ | ○ |
| 900 | ○ | × | × | ○ | ○ | ○ | ○ | ○ | ○ |
| 1, 000 | ○ | × | × | ○ | ○ | ○ | ○ | ○ | ○ |
| 2, 000 | ○ | × | × | ○ | ○ | ○ | ○ | ○ | ○ |
| 3, 000 | ○ | × | × | ○ | ○ | ○ | ○ | ○ | ○ |
| 4, 000 | ○ | × | × | ○ | ○ | ○ | ○ | ○ | ○ |
| 5, 000 | ○ | × | × | ○ | ○ | ○ | ○ | ○ | ○ |
| 6, 000 | ○ | × | × | ○ | ○ | ○ | ○ | ○ | ○ |
| 7, 000 | ○ | △ | ○ | ○ | ○ | ○ | ○ | ○ | ○ |
| 8, 000 | ○ | △ | ○ | ○ | ○ | ○ | ○ | ○ | ○ |
| 9, 000 | ○ | △ | ○ | ○ | ○ | ○ | ○ | ○ | ○ |
| 10, 000 | ○ | ○ | ○ | ○ | ○ | ○ | ○ | ○ | ○ |
| 20, 000 | — | — | — | — | — | — | — | — | ○ |

○ : NO VISUAL PROBLEM

△ : FOG IS AT ACCEPTABLE LEVEL ALTHOUGH IT CAN BE VISUALLY RECOGNIZED

× : FOG CAN BE VISUALLY CONFIRMED AND IS AT UNACCEPTABLE LEVEL

IMAGE FORMING APPARATUS AND DETERMINATION METHOD

The entire disclosure of Japanese patent Application No. 2022-131071, filed on Aug. 19, 2022, is incorporated herein by reference in its entirety.

BACKGROUND

Technological Field

The present disclosure relates to an image forming apparatus and a determination method, and more particularly, to a technique for determining presence or absence of a change in toner charging characteristics before and after replacement of a toner bottle.

Description of the Related Art

An electrophotographic image forming apparatus forms an electrostatic latent image on a surface of a photoreceptor, supplies toner to the electrostatic latent image to form a toner image, transfers the toner image onto a print surface of a recording medium, and then thermally fixes the toner image to form an image.

In recent years, it has become difficult to provide a toner of the same type as that at the time of product development due to toner production problems, reduction, and efficiency improvement, and a new toner having different chargeability from conventional product toners used in the market may be supplied.

The image forming apparatus is designed on the assumption that genuine toner at the time of product development is used, but new genuine toner having different toner charging characteristics and non-genuine toner are often used due to various circumstances as described above.

Since genuine toner at the time of product development and new genuine toner or non-genuine toner may have different characteristics, in a case where such a toner is used, it may be difficult to form an image of desired quality.

In response to such a problem, for example, in a case where a toner contained in a toner bottle mounted to an image forming apparatus is a non-genuine product, a technique of setting an adjustment value of a toner concentration in a developing apparatus that supplies a toner to an electrostatic latent image to a default value is disclosed (see JP 2013-101194 A).

Since the default value of the toner concentration is set to a value at which a printing failure is unlikely to occur on the assumption of an average temperature, humidity, paper quality, and the like in the use environment of the image forming apparatus, it can be expected that even if the non-genuine toner has characteristics slightly different from those of the genuine toner, extreme deterioration of image quality can be avoided.

In addition, there is also disclosed a technique for displaying that an image density correction operation is not performed in a case where the toner bottle mounted on an image forming apparatus is determined to be a non-genuine product (see JP 2010-266588 A).

Since the non-genuine toner may have different characteristics from the genuine toner, if the correction operation of the image density designed on the assumption of the genuine toner is performed, the image quality may be deteriorated conversely. Therefore, in the case of using a non-genuine toner, there is a possibility that extreme deterioration of image quality can be avoided by stopping the image density correction operation.

The toner supplied from the toner bottle is temporarily stored in the developing apparatus and then supplied to the electrostatic latent image. In addition, depending on the image forming apparatus, a sub-hopper may be provided on a toner supply path from the toner bottle to the developing apparatus. In such a case, the toner is also stored in the sub-hopper.

Therefore, at the time when the toner bottle is replaced, the toner (hereinafter, referred to as “original toner”) supplied from the toner bottle mounted before replacement often remains in the developing apparatus or the sub-hopper, and when the toner (hereinafter, referred to as “new toner”) is supplied from the newly mounted toner bottle, the new toner and the original toner are mixed and stirred in the developing apparatus or the sub-hopper.

In a case where the characteristics of the toner, particularly the chargeability, are different between the new toner and the original toner, frictional charging occurs between the toners by being mixed and stirred. When the polarization of the charge distribution occurs due to the frictional charging, the amount of toner with a low charge amount is larger than that in a case where only one type of toner is used. Fog is generated when the toner of the low charge amount adheres to the non-image portion on the surface of the photoreceptor.

In the example illustrated in FIG. 14, when toners having different chargeability are mixed by replacing the toner bottle with respect to the toner charge distribution (graph 1401) before replacement of the toner bottle, the toner charge distribution is polarized (graph 1402).

After that, when the toner supplied from the toner bottle before replacement is used up, only new toner is present in the developing apparatus, in a manner that the polarization of the toner charge distribution is eliminated (graph 1403).

Note that, in a case where the bulk density is different between the new toner and the original toner, the toner carrier ratio of the developing agent may not be correctly detected using the magnetic sensor.

In a case where the toner carrier ratio detected using the magnetic sensor is lower than the actual toner carrier ratio, as a result of performing the adjustment operation of the toner concentration, the toner carrier ratio becomes too high, and there is a possibility that internal contamination due to dust occurs.

In addition, in a case where the toner carrier ratio detected using the magnetic sensor is higher than the actual toner carrier ratio, as a result of performing the adjustment operation of the toner concentration, the toner carrier ratio becomes too low, and there is a possibility that the carrier adheres to the surface of the photoreceptor and damages the photoreceptor when the electrostatic latent image is developed.

Such a problem may occur not only between genuine toner and non-genuine toner, but also between genuine toners or between non-genuine toners if there is a difference in chargeability. Therefore, it is not possible to detect a change in chargeability between non-genuine toners or between genuine toners only by determining whether the toner is a genuine product or a non-genuine product as in the conventional technique, and thus it is difficult to cope with the problem.

SUMMARY

The present disclosure has been made in view of the above-described problems, and an object is to provide an image forming apparatus and a determination method capable of determining the presence or absence of a change in toner chargeability before and after replacement of a toner bottle.

To achieve the abovementioned object, according to an aspect of the present invention, an electrophotographic image forming apparatus reflecting one aspect of the present invention comprises: a replacement detector that detects that a toner bottle has been replaced; a developer that develops an electrostatic latent image by using a toner supplied from the toner bottle and stored; a fog detector that detects a fog amount; and a determiner that determines whether or not the detected fog amount continuously exceeds a predetermined threshold value in a state where a toner supplied from a toner bottle before replacement and a toner supplied from a toner bottle after replacement are mixed in the developer.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 9 is a table explaining setting contents for each setting item of Comparative Examples 1 to 3 and Examples 1 to 6;

FIG. 12 is a table illustrating transition of a fog margin with respect to the image formed sheet cumulative number P for Comparative Examples 1 to 3 and Examples 1 to 6;

FIG. 13 is a table illustrating an occurrence state of fog for each image formed sheet cumulative number P in for Comparative Examples 1 to 3 and Examples 1 to 6.

DETAILED DESCRIPTION OF EMBODIMENTS

Hereinafter, one or more embodiments of an image forming apparatus and a determination method according to the present invention will be described with reference to the drawings. However, the scope of the invention is not limited to the disclosed embodiments.

[1] First Embodiment

In the present embodiment, when fog is continuously detected a plurality of times within a predetermined period after replacement of the toner bottle, it is determined that the chargeability has changed between the toner contained in the toner bottle before replacement and the toner contained in the toner bottle after replacement.

In addition, in a case where it is determined that the chargeability of the toner has changed due to replacement of the toner bottle, the method of setting the fog margin is changed.

(1-1) Configuration of Image Forming Apparatus

First, a configuration of an image forming apparatus 1 according to a first embodiment of the present disclosure will be described.

Figure 1:
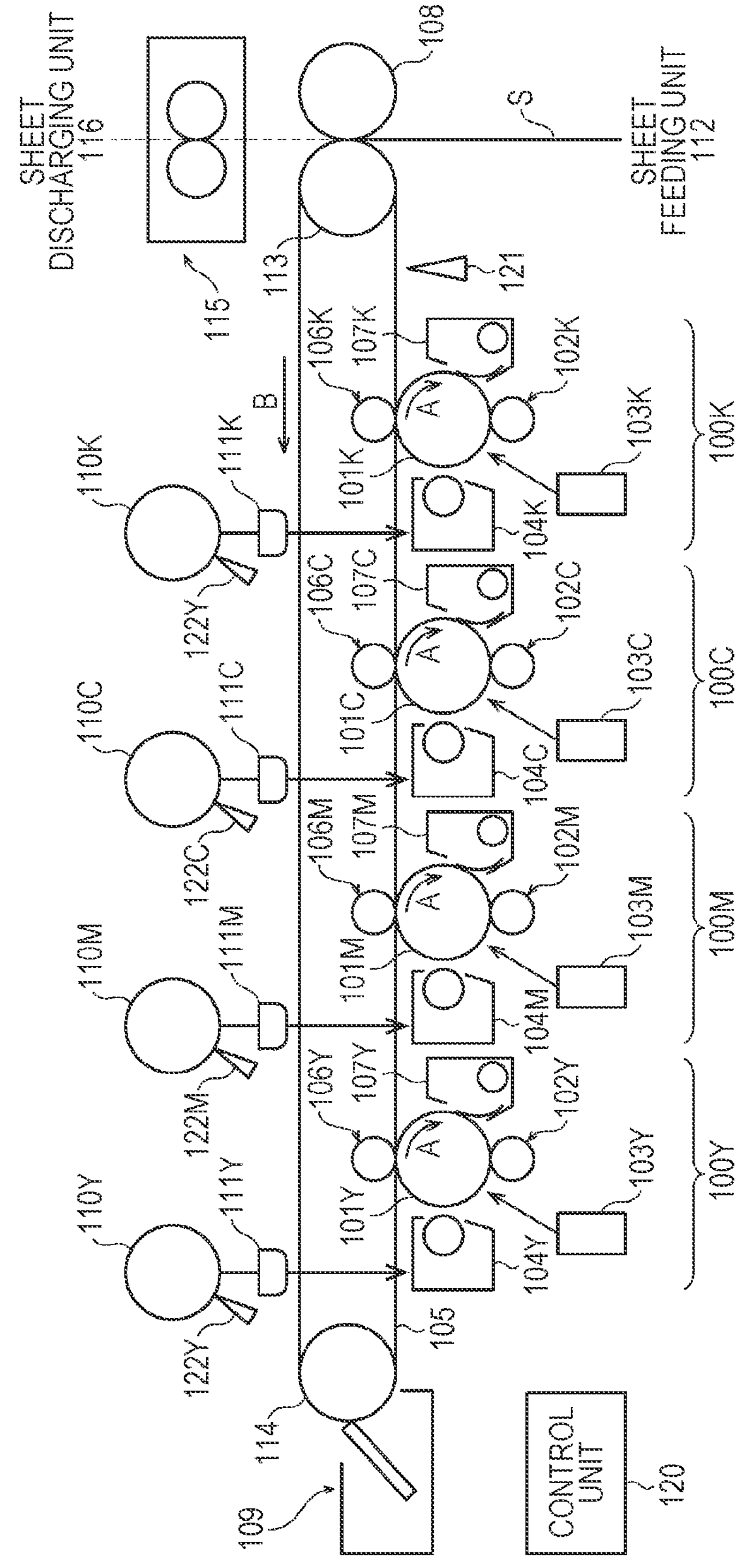
FIG. 1 is a diagram illustrating a main configuration of an image forming apparatus 1 according to a first embodiment of the present disclosure.

The image forming apparatus 1 is an electrophotographic image forming apparatus, and is a so-called tandem color printer. FIG. 1 illustrates a schematic configuration of a main part that executes an electrophotographic process of the image forming apparatus 1.

As illustrated in FIG. 1, the image forming apparatus 1 includes image forming units 100Y, 100M, 100C, and 100K that form toner images of respective colors of yellow (Y), magenta (M), cyan (C), and black (K). Toner bottles 110Y, 110M, 110C, and 110K containing toners of respective colors of Y, M, C, and K are mounted to the image forming apparatus 1.

Hereinafter, in a case where the configuration common to the image forming units 100Y, 100M, 100C, and 100K and the toner bottles 110Y, 110M, 110C, and 110K is described, the characters Y, M, C, and K representing the color of the toner image are omitted.

The image forming unit 100 includes a photoreceptor drum 101, a charger 102, an exposer 103, a developer 104, a primary transferer 106, and a photoreceptor drum cleaner 107.

The photoreceptor drum 101 has a cylindrical shape and is rotationally driven in the direction of an arrow A. A photoreceptor layer is formed on the outer peripheral surface of the photoreceptor drum 101.

As the charger 102, for example, a charging roller can be used, but the outer peripheral surface of the photoreceptor drum 101 is uniformly charged. The exposer 103 forms an electrostatic latent image by irradiating the outer peripheral surface of the photoreceptor drum 101 with a laser beam modulated according to data of an image to be formed.

The developer 104 receives toner supply from the toner bottle 110 and stores the toner. When the photoreceptor drum 101 rotates in the direction of the arrow A and the electrostatic latent image is conveyed to the developing position by the developer 104, the developer 104 supplies the stored toner to the electrostatic latent image by the action of the electric field force generated by the developing bias and develops the electrostatic latent image to form a toner image.

The developer 104 includes a toner concentration (Tc) sensor 212 (not illustrated). The toner concentration sensor 212 is a so-called magnetic permeability sensor, and detects a magnetic permeability particularly corresponding to the carrier amount of the developing agent stored in the developer.

In a case where the detected magnetic permeability is high, the carrier amount is large, and therefore the toner concentration is low. Conversely, in a case where the magnetic permeability is low, the carrier amount is small, in a manner it can be determined that the toner concentration is high.

In a case where it is determined that the toner concentration is low, the toner is supplied from the toner bottle 110 to the developer 104 via a sub-hopper 111 using a toner supply system (not illustrated). In this case, the toner supply system supplies a predetermined amount of toner under the control of the control unit 120.

In the present embodiment, the developing agent capacity of the developer 104 is 250 g, the capacity of the sub-hopper 111 is 20 g, and the toner concentration Tc in the developer 104 is controlled to be a target value 6.0%.

Note that, it is needless to say that the target values of the developing agent capacity of the developer 104, the capacity of the sub-hopper 111, and the toner concentration Tc are not limited to these, and other values may be adopted according to the model of the image forming apparatus 1 and the like.

The sub-hopper 111 is a tank for temporarily storing the toner supplied from the toner bottle 110. If the sub-hopper 111 is disposed, the toner stored in the sub-hopper 111 can be supplied to the developer 104 even after the toner bottle 110 becomes empty. Note that the toner supply system may not include the sub-hopper 111.

When the photoreceptor drum 101 rotates in the direction of the arrow A and the toner image is conveyed to the primary transfer position by the primary transferer 106, the primary transferer 106 electrostatically transfers the toner image from the outer peripheral surface of the photoreceptor drum 101 to the outer peripheral surface of an intermediate transfer belt 105 by the action of the electric field force generated by the primary transfer bias (primary transfer).

The intermediate transfer belt 105 is an endless belt body, and is wound around a driving roller 113, a driven roller 114, and a primary transfer roller which is the primary transferer 106 in a state where a constant belt tension is applied. The intermediate transfer belt 105 is rotationally driven by the driving roller 113 to circulate in the direction of an arrow B.

While the intermediate transfer belt 105 is caused to circulate, primary transfer is sequentially performed at the same timing in a manner that the toner images of the respective colors of YMCK formed by the image forming units 100Y, 100M, 100C, and 100K overlap each other on the outer peripheral surface of the intermediate transfer belt 105. Thus, a color toner image is formed.

The photoreceptor drum cleaner 107 scrapes off the toner remaining on the outer peripheral surface of the photoreceptor drum 101 after the primary transfer or exposes the outer peripheral surface of the photoreceptor drum 101 to remove the remaining charge.

A secondary transfer roller as the secondary transferer 108 is pressed against the driving roller 113 with the intermediate transfer belt 105 interposed between. As a result, a secondary transfer nip is formed.

The intermediate transfer belt 105 circulates in the direction of the arrow B to convey the toner image to the secondary transfer nip. In accordance with this timing, a recording medium S is supplied from a sheet feeding unit 112 and conveyed to the secondary transfer nip. The recording medium S is a sheet-like member such as paper.

The secondary transferer 108 electrostatically transfers the toner image from the outer peripheral surface of the intermediate transfer belt 105 to the image forming surface of the recording medium S by the action of the electric field force generated by the secondary transfer bias (secondary transfer).

After the secondary transfer, the toner remaining on the outer peripheral surface of the intermediate transfer belt 105 is conveyed to an intermediate transfer belt cleaner 109 by the circulation of the intermediate transfer belt 105.

The intermediate transfer belt cleaner 109 scrapes the remaining toner from the outer peripheral surface of the intermediate transfer belt 105 using a cleaning blade and discards the toner.

The recording medium S to which the toner image has been secondarily transferred is conveyed to a fixing unit 115, and after the toner image is thermally fixed, the recording medium S is discharged to the outside of the apparatus by a sheet discharging unit 116.

The control unit 120 controls the operation of each unit of the image forming apparatus 1 such as the image forming unit 100, the sheet feeding unit 112, the fixing unit 115, and the sheet discharging unit 116, and monitors the state. In particular, the control unit 120 constitutes a determiner that determines that the chargeability of the toner has changed when a detected fog amount F continuously exceeds a predetermined threshold value in a state where the toner supplied from the toner bottle 110 before replacement and the toner supplied from the toner bottle 110 after replacement are mixed in the developer 104.

An image density control (IDC) sensor 121 illuminates the outer peripheral surface of the intermediate transfer belt 105 and detects the amount of reflected light. As a result, the concentration of the toner image carried on the outer peripheral surface of the intermediate transfer belt 105 can be detected.

In the present embodiment, in particular, the IDC sensor 121 is used to detect the fog amount by detecting the amount of reflected light in the non-image portion. That is, the IDC sensor 121 constitutes a fog detector.

A toner bottle sensor 122 is a bar code reader that reads a bar code printed on the outer surface of the toner bottle 110. When the bar code printed on the outer surface of the toner bottle 110 is read to acquire the identification information of the toner bottle 110, the toner bottles 110 can be identified.

Therefore, by using the toner bottle sensor 122, it is possible to detect that the toner bottle 110 has been replaced. As described above, the toner bottle sensor 122 constitutes a replacement detector for the toner bottle.

Note that, in order to detect that the toner bottle 110 has been replaced, the identification information of the toner bottle 110 may be read from an integrated circuit (IC) chip mounted to the toner bottle 110 instead of the bar code.

In addition, it is needless to say that replacement of the toner bottle 110 may be detected using a method other than the above.

Note that the photoreceptor drum 101, the charger 102, the exposer 103, the developer 104, the primary transferer 106, the photoreceptor drum cleaner 107, the secondary transferer 108, the intermediate transfer belt cleaner 109, the sheet feeding unit 112, the fixing unit 115, the sheet discharging unit 116, and the like may be used by arbitrarily selecting a well-known electrophotographic technique.

(1-2) Control Unit 120

Next, the control unit 120 will be described.

Figure 2:
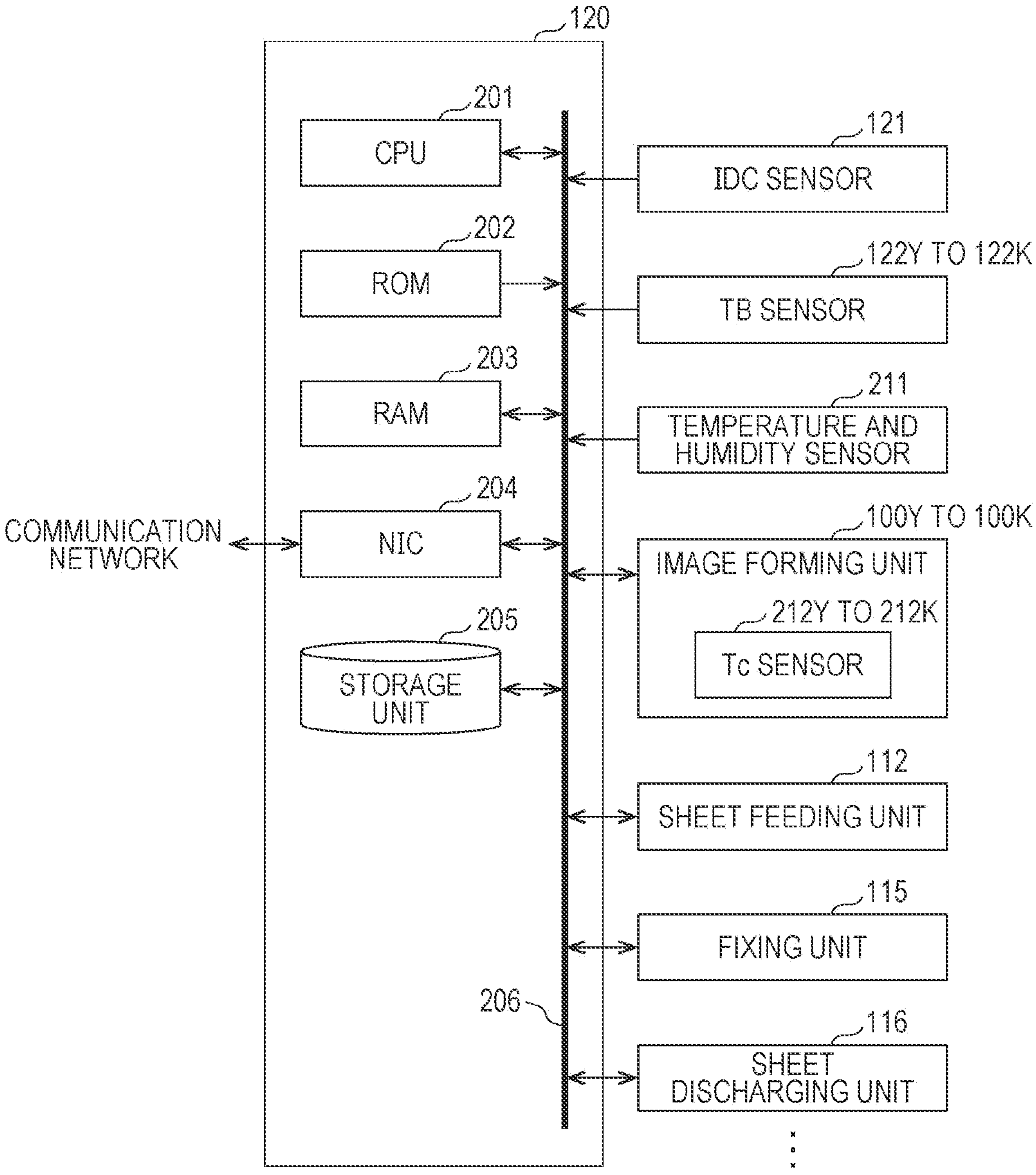
FIG. 2 is a diagram illustrating a main configuration of a control unit 120.

As illustrated in FIG. 2, the control unit 120 is a so-called computer, and includes a central processing unit (CPU) 201, a read only memory (ROM) 202, a random access memory (RAM) 203, a network interface card (NIC) 204, and a storage unit 205.

The storage unit 205 is a large-capacity nonvolatile memory, and for example, a hard disk drive (HDD) or a solid state drive (SSD) can be used. The CPU 201, the ROM 202, the RAM 203, the NIC 204, and the storage unit 205 are connected by an internal bus 206 to be able to communicate with each other.

As described above, the IDC sensor 121, the toner bottle sensors 122Y, 122M, 122C, and 122K, a temperature and humidity sensor 211, the toner concentration sensors 212Y, 212M, 212C, and 212K, the sheet feeding unit 112, the fixing unit 115, the sheet discharging unit 116, and the like are connected to the control unit 120.

The temperature and humidity sensor 211 detects temperature and humidity in the image forming apparatus 1.

When the CPU 201 is reset by, for example, turning on power to the image forming apparatus 1, the CPU 201 starts up by executing a boot program read from the ROM 202, and executes an operating system (OS), a control program, and the like read from the storage unit 205 using the RAM 203 as a working storage region.

The NIC 204 executes processing for communicating with other apparatuses via a communication network such as a local area network (LAN), the Internet, or a dedicated line. As a result, for example, an image forming job can be received from a personal computer (PC).

(1-3) Processing of Detecting Change in Chargeability of Toner

Next, processing of detecting a change in the chargeability of the toner will be described. Note that, since the processing is common for the toner of any color of Y, M, C, and K, the toner color is not particularly specified in the following description.

Figure 3:
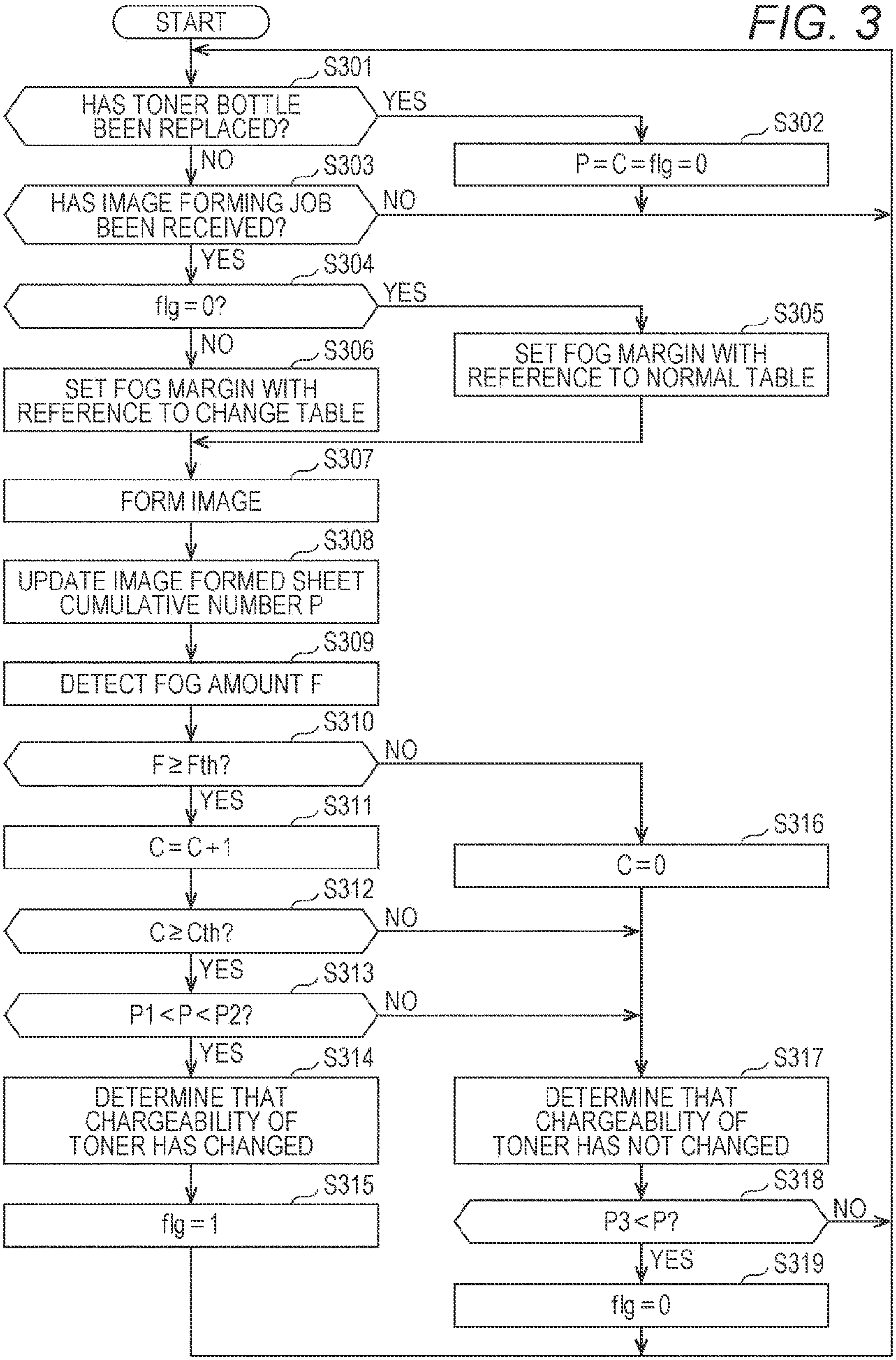
FIG. 3 is a flowchart explaining a processing of determining whether or not chargeability of toner has changed and a processing of setting fog margin according to a determination result.

As illustrated in FIG. 3, when detecting that the toner bottle 110 has been replaced with reference to the detection signal of the toner bottle sensor 122 (S301: YES), the control unit 120 of the image forming apparatus 1 initializes all working variables P, C, and flg to 0 (S302).

The working variable P is a variable that records a cumulative value (hereinafter, referred to as "image formed sheet cumulative number") of the number of image formed sheets after replacement of the toner bottle 110 as a value indicating a cumulative value of the amount of toner supplied from the toner bottle 110 after replacement of the toner bottle 110.

Since the cumulative value of the number of image formed sheets is correlated with the cumulative value of the toner consumption amount, the cumulative value is also correlated with the cumulative value of the toner supply amount. Therefore, the cumulative value of the number of image formed sheets can be used as a value indicating the cumulative value of the toner supply amount.

Note that, it is needless to say that the present disclosure is not limited to this, and an index value other than the cumulative value of the number of image formed sheets may be used as the cumulative toner supply amount, or the cumulative value itself of the toner amount may be used.

The working variable C is a variable for counting the number of times the fog amount F is detected to exceed the threshold value (hereinafter, referred to as "fog detection number").

In a case where the toner charge distribution is polarized, a state in which the fog amount F increases continues. Therefore, in the present embodiment, by counting the number of times that fog amount F has continuously become equal to or larger than a threshold value Fth as the fog detection number, it is determined whether the state in which fog amount F has increased is continued.

In a case where the fog amount F sometimes becomes equal to or larger than the threshold value Fth and the state in which fog amount F is equal to or larger than the threshold value Fth does not continue, it can be determined that the toner charge distribution is not polarized and the fog amount F temporarily increases due to another cause.

The working variable flg is a variable (hereinafter, referred to as "mixture detection flag") indicating whether or not it is detected that toners having different chargeability are mixed. In the present embodiment, the value of a mixture detection flag flg is set to 0 in a case where the mixture is not detected, and the value of the mixture detection flag flg is set to 1 in a case where the mixture is detected.

Whether the toner bottle 110 has been replaced can be determined based on whether the identification information of the toner bottle 110 read using the toner bottle sensor 122 has changed.

Note that, it is needless to say that the present disclosure is not limited to this, and it is sufficient to simply detect the removal and insertion of the toner bottle 110. In the present embodiment, as will be described later, a change in the chargeability of the toner is detected by detecting the fog caused by a mixture of toners having different chargeability.

Therefore, in a case where the removed toner bottle 110 is inserted again as it is, since toners having different chargeability are not mixed, fog does not occur, and thus there is no possibility that a change in the chargeability of the toner is erroneously detected.

That is, even in a case of simply detecting the removal and insertion of the toner bottle 110, the accuracy of detecting the change in the toner chargeability can be maintained.

After that, in a case where an image forming job is received (S303: YES), it is necessary to set a fog margin in a manner that fog does not occur in the image to be formed.

Therefore, in a case where the value of the mixture detection flag flg is 0 with reference to the value of the mixture detection flag flg (S304: YES), the fog margin is set with reference to the fog margin table (hereinafter, referred to as "normal table") for when toners having different chargeability are not mixed (S305).

The normal table is a table that stores the fog margin voltage for each printing rate of an image to be formed, temperature and humidity in the image forming apparatus 1, and development conditions. The control unit 120 specifies the printing rate from the image data and acquires the temperature and humidity using the temperature and humidity sensor 211.

The development conditions can be set by, for example, image stabilization processing. When the fog margin is determined by referring to the normal table, the charging potential of the charger 102 and the development potential of the developer 104 are set according to the fog margin.

In addition, in a case where the value of the mixture detection flag flg is 1 (S304: NO), the fog margin is set with reference to the fog margin table (hereinafter, referred to as "change table") for when toners having different chargeability are mixed (S306).

The change table is a table that stores the fog margin voltage according to the image formed sheet cumulative number P in addition to the printing rate of an image to be formed, temperature and humidity in the image forming apparatus 1, and development conditions. The control unit 120 refers to the change table to determine the fog margin, and sets the charging potential and the development potential.

In a case where fog is suppressed by setting the fog margin with reference to the fog margin table, in the conventional technique, a fixing method using only a normal table is adopted as the fog margin table regardless of whether or not toners having different chargeability are mixed.

In contrast to such a conventional technique, in the present embodiment, a switching method is adopted in which the fog margin table is switched from the normal table to the change table in a case where it is determined that the chargeability of the toner has changed. In this way, fog can be suppressed even in a case where toners having different chargeability are mixed.

Figure 4:
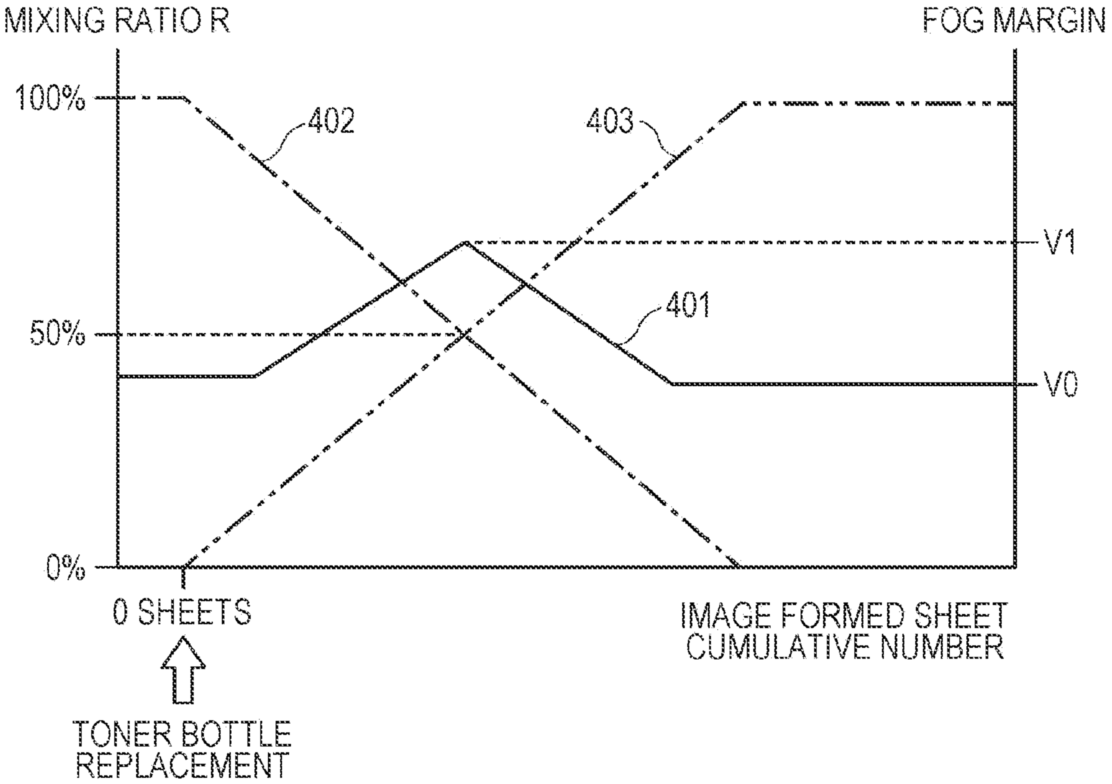
FIG. 4 is a graph illustrating a relationship between a mixture ratio of toner supplied from a toner bottle 110 and a setting value of a fog margin.

FIG. 4 is a graph explaining an outline of setting of the fog margin in the change table. As illustrated in FIG. 4, the fog margin in the change table increases as the image formed sheet cumulative number P increases after replacement of the toner bottle 110, as indicated by a solid line graph 401.

In addition, as the image formed sheet cumulative number P increases, the proportion of the toner (hereinafter, referred to as "original toner") supplied from the toner bottle 110 before replacement in the toner stored in the developer 104 gradually decreases as illustrated in a one-dot chain line graph 402.

On the other hand, the proportion (hereinafter, referred to as "mixture ratio R") of the toner (hereinafter, referred to as "new toner") supplied from the toner bottle 110 after replacement gradually increases as indicated by a two-dot chain line graph 403. The graphs 402 and 403 intersect when mixture ratio R is 50%.

The fog margin in the change table is V0 in a case where the mixture ratio R is 0% and 100%. Then, as the image formed sheet cumulative number P increases and the mixture ratio R gradually increases from 0% to 50%, the fog margin gradually increases, and in a case where the mixture ratio R is 50%, a maximum value V1 is obtained.

After that, as the image formed sheet cumulative number P further increases and the mixture ratio R gradually increases from 50% to 100%, the fog margin gradually decreases and returns to V0. In this manner, fog can be suppressed since the fog margin is increased according to the image formed sheet cumulative number P even if the toner charge distribution is polarized due to the mixture of toners having different chargeability.

After that, an image is formed (S307), and the number of formed images is added to the image formed sheet cumulative number P (S308).

In addition, the fog amount F is detected by detecting the reflection density of the non-image portion on the outer peripheral surface of the intermediate transfer belt 105 using the IDC sensor 121 (S309). As the amount of toner adhering to the non-image portion increases, the reflection density detected using the IDC sensor 121 increases, and the fog amount F increases.

Whether or not the region to be detected by the IDC sensor 121 on the outer peripheral surface of the intermediate transfer belt 105 is the non-image portion can be determined using, for example, image data for forming the toner image.

The fog amount F is compared with threshold value Fth, and in a case where the fog amount F is equal to or larger than the threshold value Fth (S310: YES), a fog detection number C is increased by 1 (S311). The fog amount F increases as a change in chargeability increases. Therefore, the fog amount F in a case where the minimum change that needs to be detected is generated among the changes in the chargeability is set as threshold value Fth.

In addition, in a case where the fog amount F is smaller than threshold value Fth (S310: NO), the fog detection number C is returned to 0 (S316). This is for detecting that the fog amount F has continuously exceeded the threshold value Fth.

Next, the fog detection number C is compared with a threshold value Cth. In the present embodiment, the threshold value Cth of the fog detection number C is set to two times. However, it is needless to say that the present disclosure is not limited to this, and may be three or more times. However, the smaller the number of times the threshold value Cth is, the earlier it can be determined that the chargeability of the toner has changed.

For example, in a case where the fog detection frequency is high, the value of the threshold value Cth may be increased, and conversely, in a case where the fog detection frequency is low, the value of the threshold value Cth is desirably decreased. If the change in the toner chargeability can be determined early, fog caused by the change in the toner chargeability can be suppressed early.

As described above, the mixture ratio R of the new toner in the entire toner stored in the developer 104 gradually increases from 0% to 100%.

In a case where the difference in chargeability between the original toner and the new toner is large, the fog amount F increases. Therefore, even if the mixture ratio R is small, the fog amount F exceeds the threshold value Fth and the fog amount F continues to exceed the threshold value Fth until the mixture ratio R increases.

That is, since the range of the mixture ratio R in which the fog amount F exceeds the threshold value Fth is widened, the fog detection number C also increases.

Conversely, in a case where the difference in chargeability between the original toner and the new toner is small, the fog amount F decreases, and thus the range of the mixture ratio R in which the fog amount F exceeds the threshold value Fth is narrowed. Therefore, the fog detection number C is reduced.

Therefore, by setting the threshold value of the fog detection number C, it is possible to specify how much the difference in chargeability between the original toner and the new toner is required to detect that the chargeability of the toner has changed.

In a case where the fog detection number C is equal to or larger than the threshold value Cth (S312: YES), it is confirmed whether the image formed sheet cumulative number P is larger than a lower limit number P1 and smaller than an upper limit number P2.

As a result, it is confirmed whether or not the cumulative amount of toner supplied after replacement of the toner bottle 110 is within a predetermined range. Therefore, it is confirmed whether or not the original toner and the new toner are mixed in the developer 104.

The lower limit number P1 may be, for example, a number corresponding to 0.1 times the toner amount stored in the toner supply path until the toner supplied from the toner bottle 110 is supplied to the surface of the photoreceptor.

In the present embodiment, the toner amount stored in the toner supply path until the toner supplied from the toner bottle 110 is supplied to the surface of the photoreceptor is the toner amount stored in the developer 104 and the sub-hopper 111. In the image forming apparatus 1 not including the sub-hopper 111, the toner amount is the toner amount stored in the developer 104.

In addition, the upper limit number P2 may be, for example, a number corresponding to 2.5 times the toner amount stored in the toner supply path until the toner supplied from the toner bottle 110 is supplied to the surface of the photoreceptor.

Note that, it is needless to say that the method of setting the lower limit number P1 and the upper limit number P2 is not limited to the above, and the lower limit number P1 and the upper limit number P2 may be set using other methods.

In a case where the image formed sheet cumulative number P is small, and thus the mixture ratio R is small, there is a high possibility that fog has occurred due to a cause other than mixture of the original toner and the new toner. In addition, in a case where the image formed sheet cumulative number P is large, and thus the mixture ratio R is large, there is a high possibility that fog has occurred due to a cause other than mixture of the original toner and the new toner.

In order not to erroneously determine that the chargeability of the toner has changed due to fog caused by a cause other than such mixture of toners, it is determined that the chargeability of the toner has not changed in a case where the image formed sheet cumulative number P is equal to or smaller than the lower limit number P1 or equal to or larger than the upper limit number P2.

On the other hand, in a case where the image formed sheet cumulative number P is larger than the lower limit number P1 and smaller than the upper limit number P2 (S313: YES), it is determined that the chargeability of the toner has changed (S314), and the value of the mixture detection flag flg is set to 0 (S315).

In a case where the fog amount F is smaller than threshold value Fth (S310: NO), in a case where the fog detection number C is smaller than the threshold value Cth (S312: NO), and in a case where the image formed sheet cumulative number P is equal to or smaller than the lower limit number P1 or the image formed sheet cumulative number P is equal to or larger than the upper limit number P2 (S313: NO), it is determined that toners having different chargeability are not mixed (S317).

Then, in a case where the image formed sheet cumulative number P is larger than a threshold value number P3 (S318: YES), the value of the mixture detection flag flg is reset to 0 (S319).

Here, the threshold value number P3 may be, for example, a number corresponding to three times the toner amount stored in the toner supply path until the toner supplied from the toner bottle 110 is supplied to the surface of the photoreceptor.

In this way, in a case where the image formed sheet cumulative number P exceeds the threshold value number P3, it is considered that the original toner is used up and only the new toner is used, and the mixed state of the original toner and the new toner is eliminated. Therefore, even if the fog margin table is returned to the normal table, the occurrence of fog can be suppressed.

Note that, it is needless to say that the method of setting the threshold value number P3 is not limited to the above, and the threshold value number P3 may be set using other methods.

In this way, it is possible to determine whether the chargeability has changed between the original toner and the new toner without referring to the identification information of the toner bottle 110.

(1-4) Target Value of Toner Concentration Tc in Developer 104

The toner concentration Tc in the developer 104 is controlled to be a predetermined target value (hereinafter, it is referred to as "target Tc").

When the target Tc is kept at the target Tc set assuming the original toner after the toner in the developer 104 is completely replaced from the original toner to the new toner, a toner image having a target concentration may not be obtained at a development potential within an appropriate range.

In such a case, when the target Tc is reset in accordance with the characteristics (such as bulk density) of the new toner, the development potential can be returned to an appropriate range.

Hereinafter, the case where the development potential for obtaining a toner image of a target concentration specified in the image stabilization processing is higher than an appropriate range and the case where the development potential is lower than the appropriate range will be separately described.

In addition, the appropriate range of the development potential is a range of a first lower limit value V11 or more and a first upper limit value Vu1 or less. In addition, the allowable range of the development potential is a range of a second lower limit value V12 or more and a second upper limit value Vu2 or less.

The allowable range of the development potential includes the appropriate range of the development potential, and therefore, it is $V12<V11<Vu1<Vu2$ . . . (1).

Figure 5:
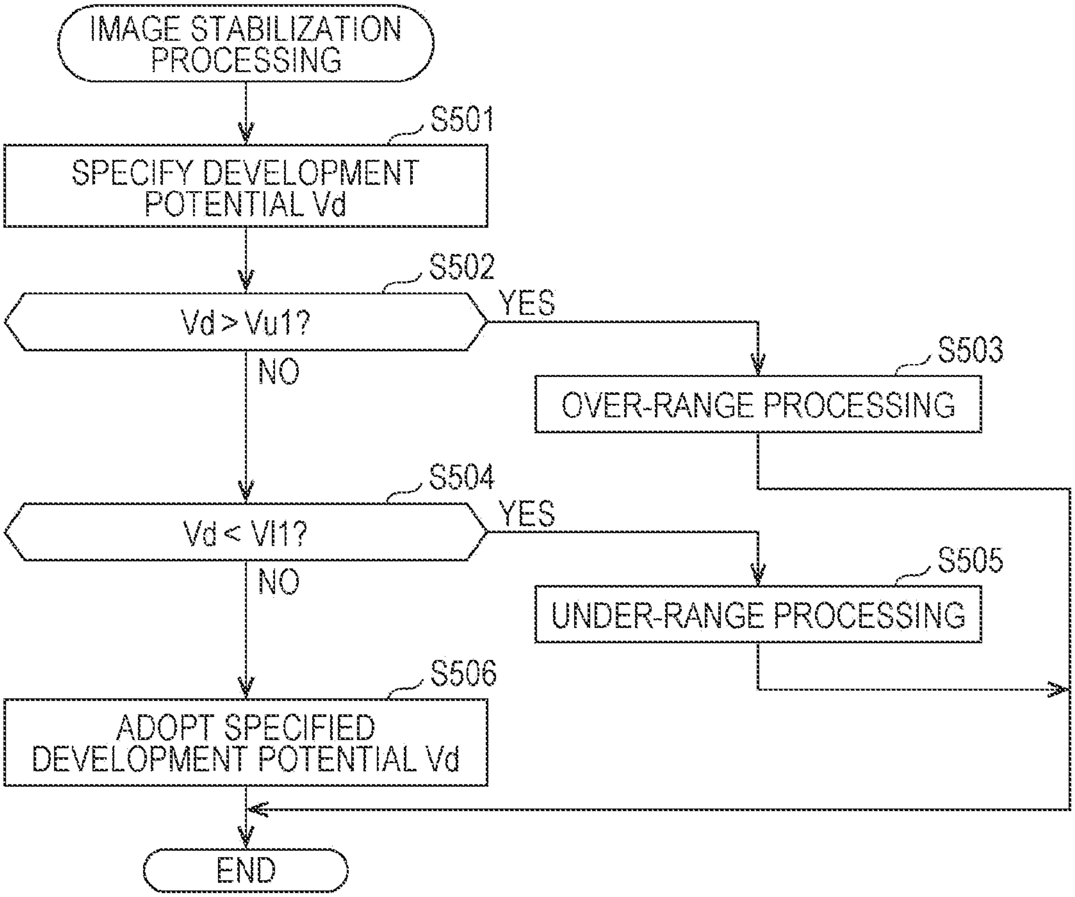
FIG. 5 is a flowchart explaining a part particularly related to setting of a development potential in an image stabilization processing.

As illustrated in FIG. 5, in the image stabilization processing, a development potential Vd for obtaining a toner image of a target concentration is specified (S501). For example, a toner image may be formed at various development potentials, and the concentration of the toner image may be detected using the IDC sensor 121 to specify the development potential Vd used when a toner image having a target concentration is formed.

In a case where the specified development potential Vd is higher than the upper limit (first upper limit value) Vu1 of the appropriate range of the development potential (S502: YES), the over-range processing as described later is executed (S503).

On the other hand, in a case where the specified development potential Vd is lower than the lower limit (first lower limit value) V11 of the appropriate range of the development potential (S504: YES), under-range processing as described later is executed (S505).

In a case where the specified development potential Vd is within the appropriate range (S504: NO), the specified development potential Vd is adopted as the development potential (S505).

(1-4-1) Over-Range Processing (S503)

Figure 6:
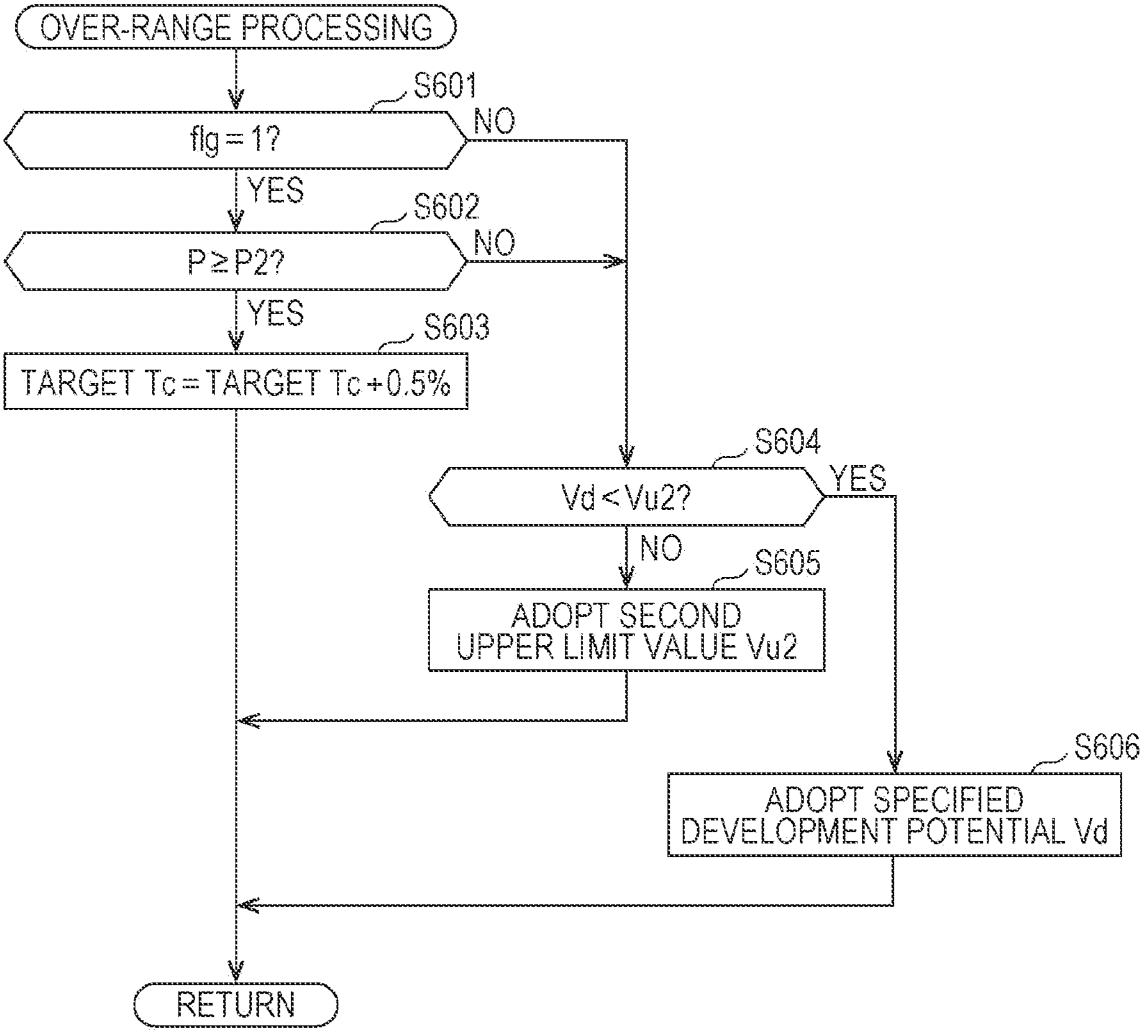
FIG. 6 is a flowchart explaining an over-range processing in the image stabilization processing.

As illustrated in FIG. 6, in the over-range processing, first, the value of the mixture detection flag flg is referred to. In a case where the value of the mixture detection flag flg is 1 and mixture of the original toner and the new toner is detected (S601: YES), the image formed sheet cumulative number P is referred to.

In a case where the image formed sheet cumulative number P is larger than the upper limit number P2 (S602: YES), it can be determined that the development potential Vd has increased due to replacement with a new toner, and thus, the target Tc is increased only by 0.5% (S603).

In this way, or by repeating such processing, a toner image having a target concentration can be obtained at a development potential lower than the specified development potential Vd.

In a case where the value of the mixture detection flag flg is 0 (S601: NO) and in a case where the image formed sheet cumulative number P is equal to or smaller than the upper limit number P2 (S602: NO), determination as to whether or not toners having different chargeability are mixed has not yet been confirmed. Therefore, whether the specified development potential Vd is within the allowable range of the development potential is confirmed even if the specified development potential Vd exceeds the appropriate range.

That is, the upper limit (second upper limit value) Vu2 of the allowable range of the development potential is compared with the specified development potential Vd, and in a case where the specified development potential Vd exceeds the second upper limit value Vu2 (S604: NO), the second upper limit value Vu2 is adopted as the development potential instead of the specified development potential Vd (S605).

On the other hand, in a case where the specified development potential Vd is smaller than the second upper limit value Vu2 (S604: YES), the specified development potential Vd is adopted (S606).

(1-4-2) Under-Range Processing (S505)

Figure 7:
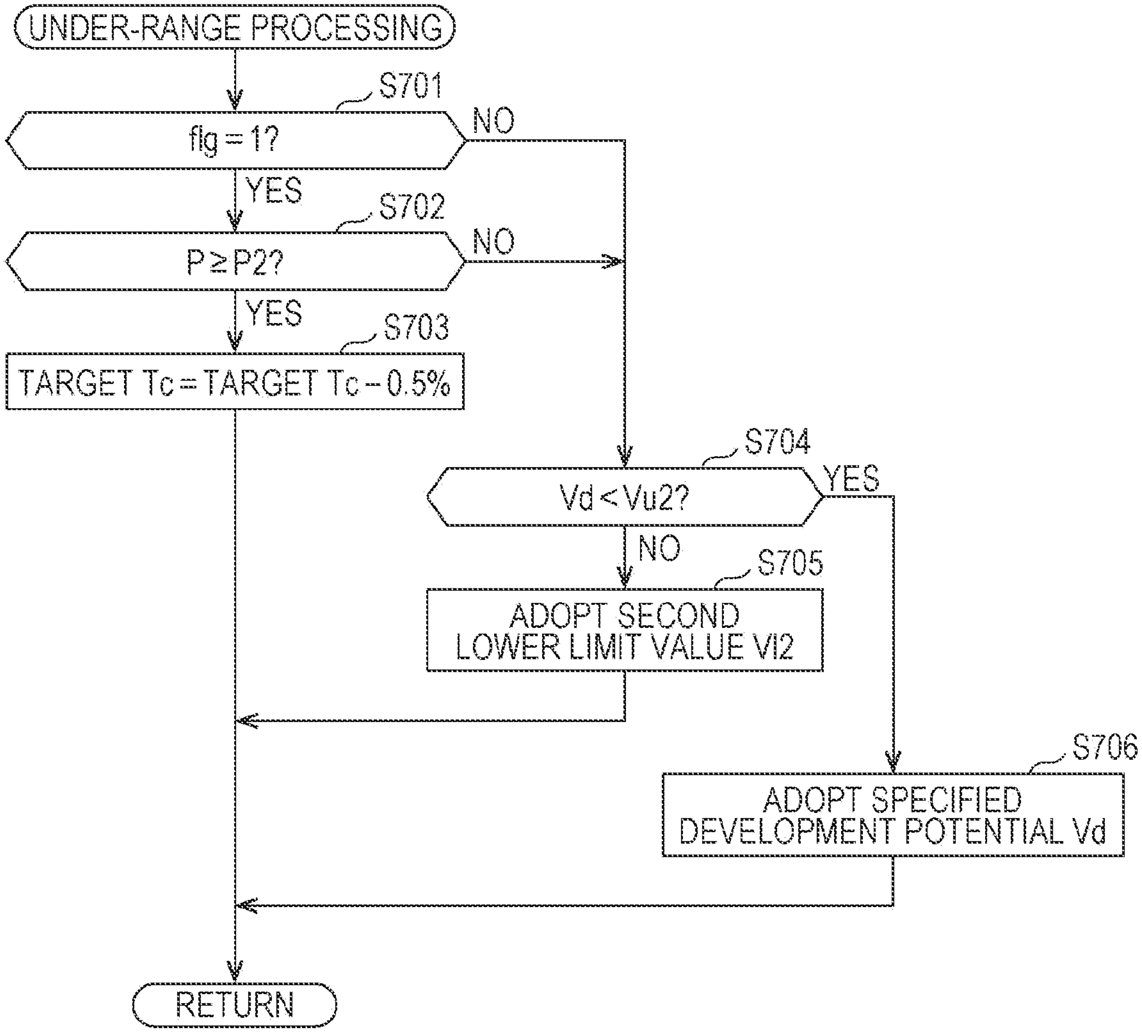
FIG. 7 is a flowchart explaining an under-range processing in the image stabilization processing.

As illustrated in FIG. 7, in the under-range processing, first, the value of the mixture detection flag flg is referred to. In a case where the value of the mixture detection flag flg is 1 and mixture of the original toner and the new toner is detected (S701: YES), the image formed sheet cumulative number P is referred to.

In a case where the image formed sheet cumulative number P is larger than the upper limit number P2 (S702: YES), it can be determined that the development potential Vd has increased due to replacement with a new toner, and thus, the target Tc is decreased only by 0.5% (S703).

In this way, or by repeating such processing, a toner image having a target concentration can be obtained at a development potential higher than the specified development potential Vd.

In a case where the value of the mixture detection flag flg is 0 (S701: NO) and in a case where the image formed sheet cumulative number P is equal to or smaller than the upper limit number P2 (S702: NO), determination as to whether or not toners having different chargeability are mixed has not yet been confirmed. Therefore, whether the specified development potential Vd is within the allowable range of the development potential is confirmed even if the specified development potential Vd is smaller than the appropriate range.

That is, the lower limit (second lower limit value) V12 of the allowable range of the development potential is compared with the specified development potential Vd, and in a case where the specified development potential Vd is smaller than the second lower limit value V12 (S704: NO), the second lower limit value V12 is adopted as the development potential instead of the specified development potential Vd (S705).

On the other hand, in a case where the specified development potential Vd is smaller than the second upper limit value Vu2 (S704: YES), the specified development potential Vd is adopted (S706).

[2] Second Embodiment (2-1) Configuration of Image Forming Apparatus 1

In the image forming apparatus 1 according to the present embodiment, the image forming unit 100 includes a surface electrometer. The surface electrometer measures the potential of the outer peripheral surface of the photoreceptor drum 101.

In a case where fog in which toner adheres to the non-image portion occurs, the surface potential of the non-image portion increases by the charged charge of the adhering toner.

Therefore, since the surface potential of the non-image portion decreases as the fog amount F decreases, the presence or absence of fog can be determined by setting the lower limit value of the surface potential and confirming whether or not the measurement value of the surface potential is equal to or smaller than the lower limit value.

If the presence or absence of fog is determined for various fog margins using this, the smallest fog margin within the range of the fog margin in which fog does not occur can be specified.

Note that, instead of the surface electrometer, the presence or absence of fog may be detected using the IDC sensor 121 as in the first embodiment.

The method of determining a fog margin M by determining the presence or absence of fog for various fog margins in this manner is hereinafter simply referred to as "detection method".

(2-2) Processing of Detecting Change in Chargeability of Toner

Figure 8:
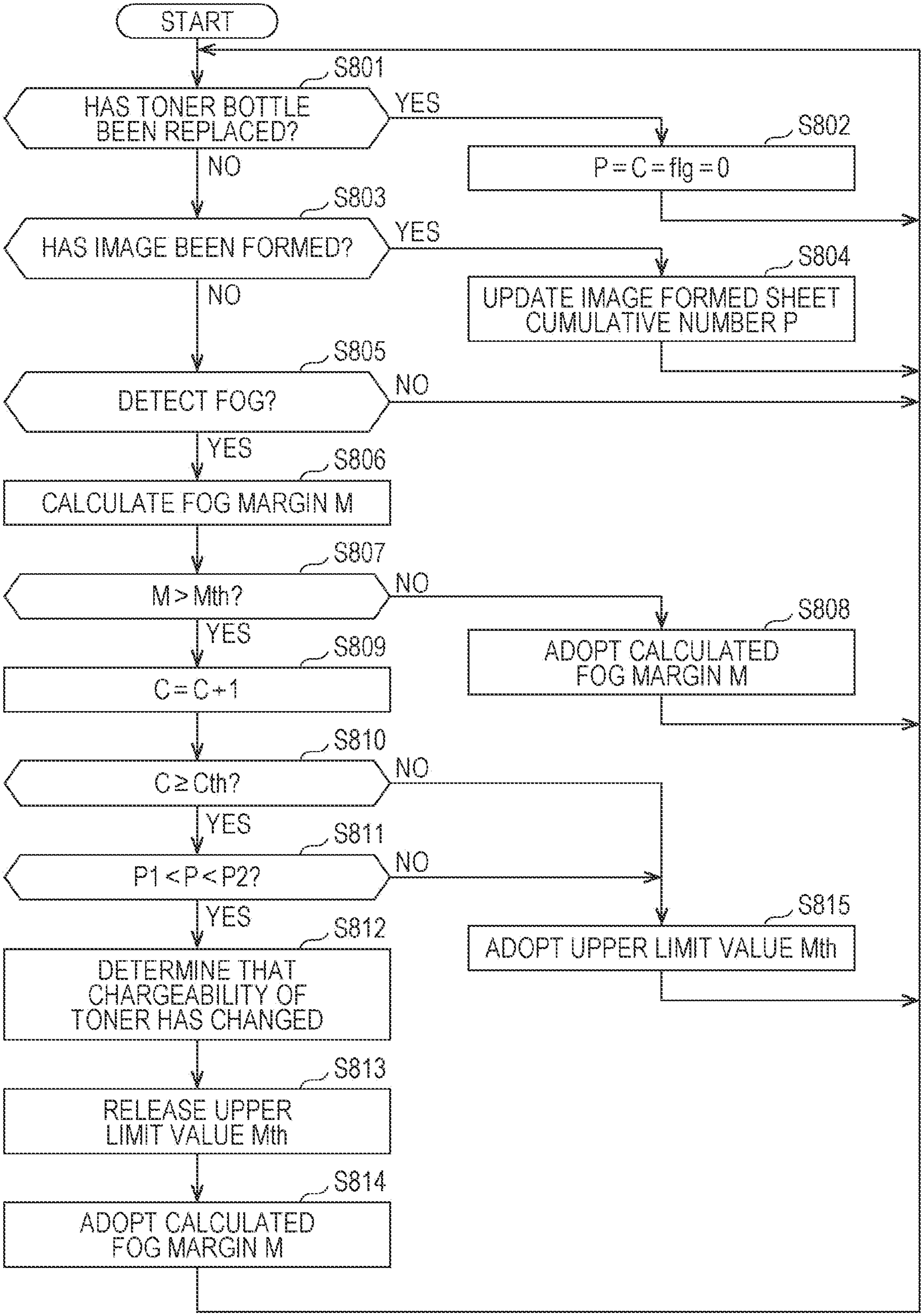
FIG. 8 is a flowchart explaining a processing of determining whether or not chargeability of toner according to a second embodiment of the present disclosure has changed and a processing of releasing an upper limit value Mth of fog margin according to a determination result.

As illustrated in FIG. 8, when detecting that the toner bottle 110 has been replaced with reference to the detection signal of the toner bottle sensor 122 (S801: YES), the control unit 120 of the image forming apparatus 1 initializes all the working variables P, C, and flg to 0 (S802).

The working variables P, C, and flg are the image formed sheet cumulative number, the fog detection number, and the mixture detection flag as in the first embodiment.

After that, in a case where an image is formed (S803: YES), the number of newly formed images is added to the image formed sheet cumulative number P (S804).

In addition, it is confirmed whether or not to detect fog. In the image stabilization processing, in a case where fog is detected, it is confirmed whether or not it is timing to perform the image stabilization processing.

For example, in a case where the change amount of the temperature and humidity detected using the temperature and humidity sensor 211 is larger than a predetermined threshold value, it is determined that it is the timing to perform the image stabilization processing.

In addition, it may be determined that it is the timing to perform the image stabilization processing in a case where the number of image formed sheets has reached a predetermined number of sheets after the previous image stabilization processing is executed.

In a case where fog is detected (S805: YES), the fog margin M is calculated by detecting the fog amount F in various fog margins using the surface electrometer as described above (S806).

In a case where the calculated fog margin M is equal to or smaller than the predetermined upper limit value Mth (S807: NO), the calculated fog margin M is adopted as a subsequent fog margin (S808).

In a case where the calculated fog margin M is larger than the predetermined upper limit value Mth (S807: YES), there is a possibility that the calculated fog margin M is large because toners having different chargeability are mixed, and thus the fog detection number C is increased by 1 (S809).

As a result, in a case where the fog detection number C has become equal to or larger than the threshold value Cth (S810: YES), it is confirmed whether the image formed sheet cumulative number P is larger than the lower limit number P1 and smaller than the upper limit number P2.

In a case where the image formed sheet cumulative number P is larger than the lower limit number P1 and smaller than the upper limit number P2 (S811: YES), it is determined that the chargeability of the toner has changed (S812), the upper limit value Mth of the fog margin is released (S813), and the calculated fog margin M is adopted as the fog margin (S814).

In a case where the fog detection number C is smaller than the threshold value Cth (S810: NO), and in a case where the image formed sheet cumulative number P is equal to or smaller than the lower limit number P1 or in a case where the image formed sheet cumulative number P is equal to or larger than the upper limit number P2 (S811: NO), the upper limit value Mth of the fog margin M is adopted as the fog margin (S815).

In this way, even in a case where the toner charge distribution is polarized due to the mixture of the original toner and the new toner, since the upper limit value Mth of the fog margin M is released and the fog margin M larger than the upper limit value Mth is adopted as the fog margin, it is possible to suppress fog caused by the polarization.

Note that, instead of releasing the upper limit value Mth of the fog margin M, switching to an upper limit value Mth' larger than the upper limit value Mth may be performed. Even in this case, since it is allowed to increase the fog margin M, it is possible to suppress fog in a case where toners having different chargeability are mixed.

In addition, after the replacement of the toner bottle, when the toner is switched from the original toner to the new toner and fog due to the polarization of charge distribution of the toner does not become a problem, the upper limit value Mth of the fog margin M is adopted again. In other words, the upper limit value Mth of the fog margin M is returned to the original value. Therefore, it is possible to minimize the disadvantage associated with the release of the upper limit value Mth of the fog margin M.

[4] Operation Example

Next, the image forming apparatus 1 according to the present embodiment will be described with reference to nine operation examples of Comparative Examples 1 to 3 and Examples 1 to 6 illustrated in FIG. 9.

As illustrated in FIG. 9, the method of setting the fog margin is a fixing method using only the normal table in Comparative Examples 1 and 2, and is a switching method of switching between the normal table and the change table in the Example 1.

In addition, in the Comparative Example 3, a detection method having the upper limit value Mth of the fog margin M is used. In Examples 2 to 6, the detection method is used similarly to Comparative Example 3, but the upper limit value Mth is released in a case where toners having different chargeability are mixed.

In addition, in Comparative Examples 1 to 3 and Examples 1 to 4, a common image forming apparatus A is used, while in Example 5, an image forming apparatus B having no sub-hopper 111 is used. In addition, the image forming apparatus C used in the Example 6 has a larger amount of developing agent that can be stored in the sub-hopper 111 and the developer 104 than the image forming apparatuses A and B.

The original toner supplied from the toner bottle 110 before replacement is a toner A in any of Comparative Examples 1 to 3 and Examples 1 to 6. On the other hand, the new toner supplied from the replaced toner bottle 110 is the same toner A as the original toner in Comparative Example 1, and is a toner B in Comparative Examples 2 and 3 and Examples 1 to 3, 5, and 6. In addition, in the Example 4, a toner C is used as a new toner.

The color/white ratio (CW ratio) is a proportion of the area of the toner adhesion region to the area of the image formable region per sheet of paper. The CW ratio can be calculated, for example, from image data of an image to be formed.

The average CW ratio of the images formed in Comparative Examples 1 to 3 and Examples 1, 2 and 4 to 6 is 5.0%, while the average CW of the images formed in the Example 3 is 10.0%.

Figure 10A:
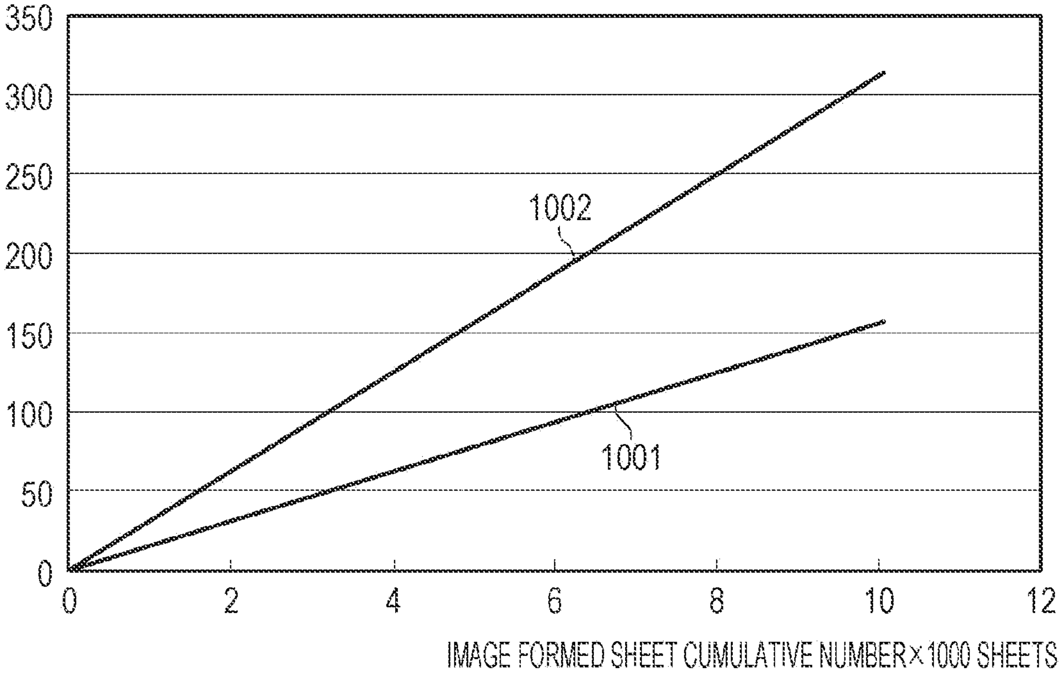
FIG. 10A is a graph illustrating a relationship between an image formed sheet cumulative number P and a toner supply amount for Comparative Examples 1 to 3 and Examples 1 to 6.

Therefore, as illustrated in FIG. 10A, in Comparative Examples 1 to 3 and Examples 1, 2, and 4 to 6, the toner supply amount with respect to the number of image formed sheets is equal to each other (graph 1001).

On the other hand, the toner supply amount (graph 1002) with respect to the number of image formed sheets in the Example 3 is twice the toner supply amount with respect to the number of image formed sheets in Comparative Examples 1 to 3 and Examples 1, 2, and 4 to 6.

The amount of developing agent that can be stored in the sub-hopper 111 is 20 g in the image forming apparatus A and 30 g in the image forming apparatus C. Since the image forming apparatus B does not include the sub-hopper 111, it is indicated as 0 g in FIG. 9.

The amount of developing agent that can be stored in the developer 104 is 250 g in the image forming apparatuses A and B and 650 g in the image forming apparatus C.

The target Tc has been set to 6.0% in all of Comparative Examples 1 to 3 and Examples 1 to 6. Therefore, the toner amount stored in the developer 104 is 15 g in the image forming apparatuses A and B and 39 g in the image forming apparatus C.

The carrier ratio in the developing agent supplied from the toner bottle 110 is 10.0% in all of Comparative Examples 1 to 3 and Examples 1 to 6.

In a case where toner is supplied from the toner bottle 110, only the amount of toner consumed for the image forming processing is supplied. In Comparative Examples 1 and 2 and Examples 1, 2, and 4, the proportion (supply amount ratio) of new toner to the total of the amount of toner that can be stored in the developer 104 and the sub-hopper 111 of the image forming apparatus A gradually increases as the number of image formed sheets increases, as illustrated in a graph 1011 in FIG. 10B.

Supply amount ratio=supply amount from toner bottle 110/(developer developing agent capacity+sub-hopper capacity) (2)

In addition, in Example 3, the average CW ratio is higher than that in Comparative Examples 1 and 2 and Examples 1, 2, and 4, and the supply amount from the toner bottle 110 which is the molecule of the Equation (2) is large, in a manner that the increase in the supply amount ratio is large as illustrated in the graph 1012.

In Example 5, since the image forming apparatus B does not include the sub-hopper 111, as compared with Comparative Examples 1 and 2 and Examples 1, 2, and 4, the denominator of Equation (2) is only the developer developing agent capacity and is small, and thus the increase in the supply amount ratio is large as illustrated in the graph 1013.

In Example 6, as compared with Comparative Examples 1 and 2 and Examples 1, 2, and 4, the developer developing agent capacity and the sub-hopper capacity of the image forming apparatus C are both large, in other words, the denominator of the equation is large, and thus the increase in the supply amount ratio is small as illustrated in the graph 1014.

Figure 11:
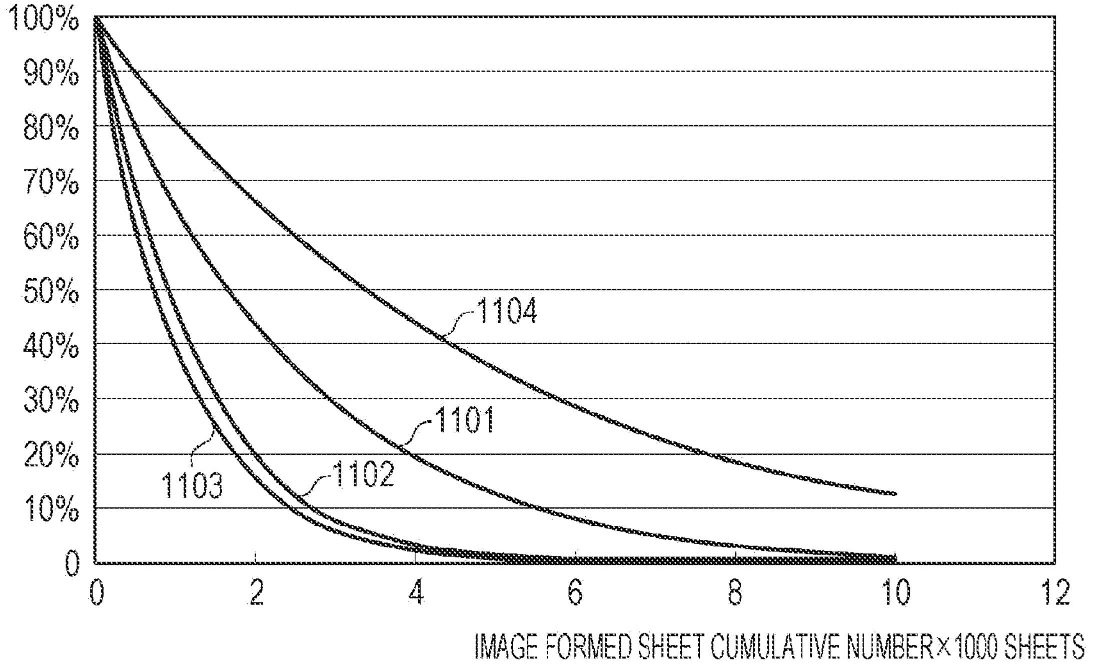
FIG. 11 is a graph illustrating a relationship between the image formed sheet cumulative number P and a residual ratio of an original toner for Comparative Examples 1 to 3 and Examples 1 to 6.
Figure 14:
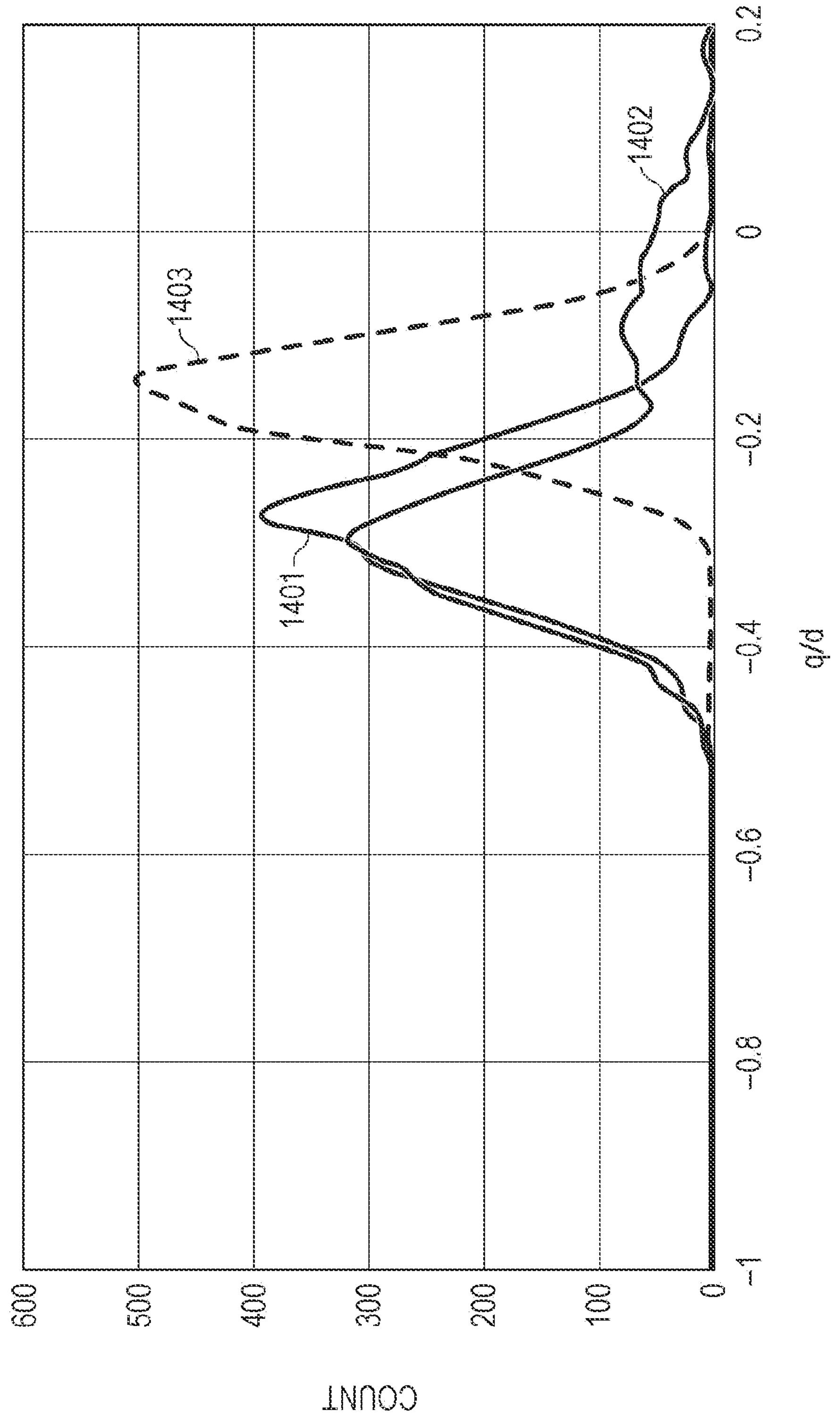
FIG. 14 is a graph illustrating a transition of a toner charge distribution after a toner bottle is replaced, in which a horizontal axis represents a charge amount per toner particle diameter, and a vertical axis represents a frequency for each charge amount per toner particle diameter.

FIG. 11 is a graph illustrating a residual ratio of the original toner in the toner stored in the developer 104 after replacement of the toner bottle.

Figure 10B:
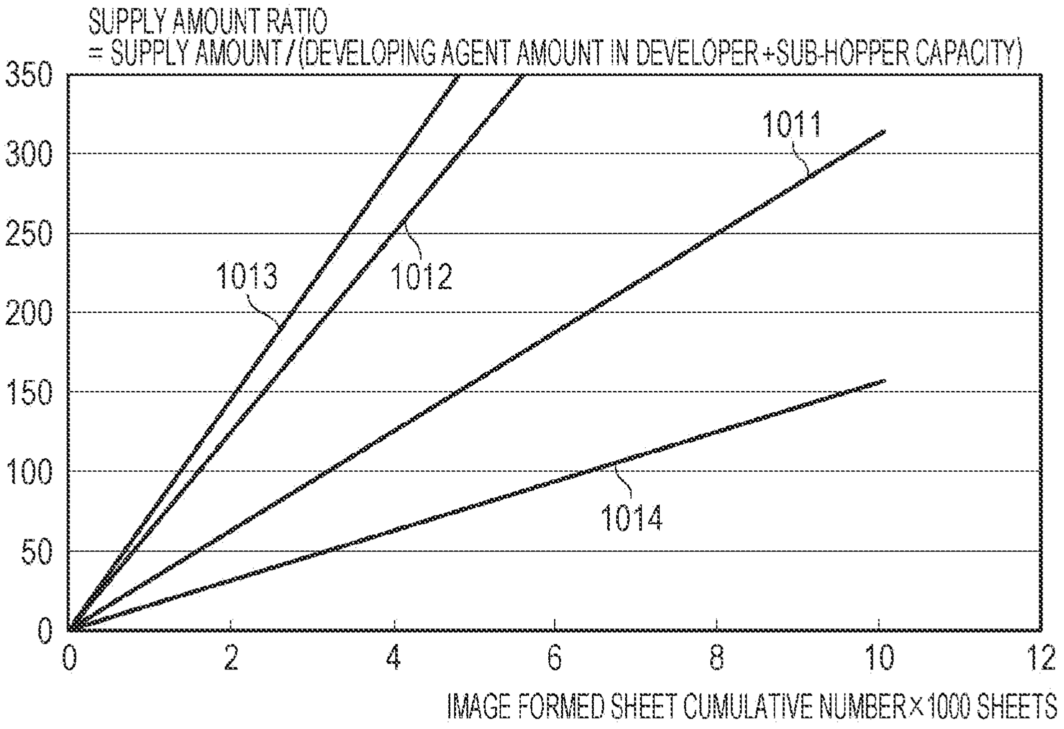
FIG. 10B is a graph illustrating a relationship between the image formed sheet cumulative number P and a supply amount ratio for Comparative Examples 1 to 3 and Examples 1 to 6.

In FIG. 10B, the larger the increase in the supply ratio of the new toner, the faster the residual ratio of the original toner gradually approaches 0 in FIG. 11.

Thus, as compared with Comparative Examples 1, 2 and Examples 1, 2 and 4 (graph 1101), Examples 3 and 4 (graphs 1102 and 1103) have a faster rate of original toner residual ratio gradually approaching 0, while Example 6 (graph 1104) has a slower rate of gradually approaching 0.

(4-1) Comparative Example 1

In Comparative Example 1, as illustrated in FIG. 9, both the toner contained in the toner bottle 110 before replacement and the toner contained in the toner bottle 110 after replacement are the toner A. Therefore, since the chargeability of the toner does not change, the charge distribution of the toner is not polarized.

The fog margin table of Comparative Example 1 is a normal table, and as illustrated in FIG. 12, the fog margin is maintained at a constant value (80 V) regardless of the image formed sheet cumulative number P after replacement of the toner bottle 110.

As a result, as illustrated in FIG. 13, fog occurs only to an extent that there is no problem visually. Note that, as noted in FIG. 13, in FIG. 13, the mark “o” indicates that fog occurs to such an extent that there is no problem visually.

The mark “A” indicates that the fog is at an acceptable level although it can be visually recognized. In addition, the mark “x” indicates that the fog can be visually confirmed and is at an unacceptable level.

(4-2) Comparative Example 2

In Comparative Example 2, as illustrated in FIG. 9, the toner contained in the toner bottle 110 before replacement is the toner A, whereas the toner contained in the toner bottle 110 after replacement is the toner B. Since the toners A and B have different chargeability, when the toners A and B are mixed, the charge distribution of the toner is polarized.

As illustrated in FIG. 12, also in Comparative Example 2, a normal table is used as the fog margin table similarly to Comparative Example 1. Thus, the fog margin is maintained at a constant value (80 V) regardless of the image formed sheet cumulative number P after replacement of the toner bottle 110.

As a result, when the toner charge distribution is polarized, fog cannot be suppressed. Therefore, as the image formed sheet cumulative number P increases and the proportion of new toner (toner B) increases, fog deteriorates and progresses from an acceptable level although it can be visually recognized to an unacceptable level as illustrated in FIG. 13.

After that, when the replacement of the toner progresses and the proportion of the original toner (toner A) decreases, fog is improved and can be visually confirmed, and after the fog decreases from an unacceptable level to an acceptable level, the fog finally becomes a level that there is no problem visually.

(4-3) Example 1

In Example 1, as illustrated in FIG. 9, the method of setting the fog margin in Comparative Example 2 is changed from the fixing method of using only the normal table to the switching method of switching between the normal table and the change table.

In this way, as illustrated in FIG. 12, as the image formed sheet cumulative number P increases after replacement of the toner bottle 110, the fog margin increases from 80 V to 100 V, 110 V, and 160 V, and finally increases to 180 V.

As described above, by increasing the fog margin using the change table, as illustrated in FIG. 13, the fog is maintained at a level that there is no problem visually.

After that, as the image formed sheet cumulative number P further increases, the fog margin decreases from 180 V to 160 V, 120 V, 110 V, and the like, and finally returns to 80 V. Even during this time, as illustrated in FIG. 13, fog is maintained at a level that there is no problem visually.

As described above, if the fog margin is adjusted according to the image formed sheet cumulative number P, fog can be effectively suppressed even if the polarized state of the toner charge distribution changes according to the mixed state of the original toner and the new toner.

(4-4) Comparative Example 3

In Comparative Example 3, as illustrated in FIG. 9, the method of setting the fog margin in Comparative Example 2 is changed from the fixing method using the normal table to the detection method of setting the fog margin by detecting the fog amount F. However, in Comparative Example 3, the upper limit value Mth (in this example, 120 V) is provided in the fog margin in order to prevent adverse effects that may be caused by increasing the fog margin too much.

In this case, as illustrated in FIG. 12, as the image formed sheet cumulative number P increases, a fog margin in which the fog amount F falls within a level having no problem is detected, and the fog margin increases from 85 V and the like to 120 V. This is a value larger than the fog margin (80 V) set in the normal table of Comparative Example 2.

Therefore, for example, in Comparative Example 2, fog can be visually observed in a range where the image formed sheet cumulative number P is 300 sheets to 500 sheets, whereas in Comparative Example 3, fog is maintained at a level having no problem.

However, since the fog margin is suppressed to be equal to or smaller than the upper limit value Mth, fog cannot be suppressed when the image formed sheet cumulative number P reaches 600 sheets, and the fog margin reaches an unacceptable level.

Furthermore, in the range from 7,000 sheets to 9,000 sheets due to the increase in the image formed sheet cumulative number P, fog can be visually observed in Comparative Example 2, whereas fog is suppressed to a level having no problem in Comparative Example 3. Even in this range, the fog margin is 120 V, 110 V, and 100 V, which are larger than 80 V in the normal table of Comparative Example 2.

After that, when the image formed sheet cumulative number P reaches 10,000, the fog margin returns to 80 V while the fog is suppressed to a level that there is no problem visually.

(4-5) Example 2

In Example 2, as illustrated in FIG. 9, in Comparative Example 3, the upper limit value Mth of the fog margin is provided in the detection method, but when toners having different chargeability are mixed and the toner charge distribution is polarized, the upper limit value Mth of the fog margin is released.

When toners having different chargeability are not mixed, the upper limit value Mth is not released, in a manner that it is possible to prevent adverse effects that may be caused by excessively increasing the fog margin. In this way, it is possible to achieve both the prevention of fog at the time of mixing toners having different chargeability and the prevention of adverse effects at the normal time.

As described above, in Comparative Example 3, the fog margin is maintained at the upper limit value Mth (120 V) within the range of the image formed sheet cumulative number P of 500 sheets to 7,000 sheets. On the other hand, in Example 2, as illustrated in FIG. 12, since the upper limit value Mth is released, the fog margin increases to 180 V beyond the upper limit value Mth. As a result, in Example 2, fog is maintained at a level that there is no problem visually.

In addition, in the Example 1, since the fog margin is set in the change table, it is necessary to set the value of the fog margin to be large with a margin in order to reliably suppress fog. On the other hand, in Example 2, since the fog margin is set by detecting the fog amount F, the fog margin can be made smaller than that in Example 1.

(4-6) Example 3

In Example 3, while having the same configuration as in Example 2, the average CW ratio of the image to be formed is 10.0%, which is twice the average CW ratio of 5.0% in Example 2. Therefore, the toner supply amount per cumulative number of image formed sheet cumulative number P is doubled.

Therefore, as illustrated in FIG. 12, the fog margin reaches a large value with a smaller image formed sheet cumulative number P than in Example 2. For the same reason, the image formed sheet cumulative number P in which the fog margin returns to the original small value also decreases.

In addition, similarly to Example 2, in a case where toners having different chargeability are mixed, the upper limit value Mth of the fog margin is released, and thus the fog margin is a value larger than the upper limit value Mth (120 V) when the image formed sheet cumulative number P is in the range of 500 sheets to 6,000 sheets.

In this way, as illustrated in FIG. 13, fog can be suppressed to a level that there is no problem visually even in a case where toners having different chargeability are mixed.

As described above, by adopting the detection method of releasing the upper limit value Mth of the fog margin, fog can be effectively suppressed even in a case where the average CW ratio of the image to be formed is large and the amount of toner supplied from the toner bottle 110 is large.

As in Example 3, when the average CW ratio is high, the toner is replaced quickly. Conversely, a lower average CW ratio results in slower toner replacement.

In a case where the fog margin table is used as in Example 1, the fog margin is fixed for each image formed sheet cumulative number P, and thus, it is not possible to change the timing of changing the fog margin following the fluctuation of the average CW ratio.

On the other hand, in a case where the fog margin is set using the detection method as in Examples 2 to 6, there is an advantage that it is easy to change the fog margin following the fluctuation of the average CW ratio.

(4-7) Example 4

In Example 4, the same configuration as that of Example 2 is provided. On the other hand, in Example 2, the toner B is supplied from the toner bottle 110 after replacement, whereas in Example 4, the toner C is supplied from the toner bottle 110 after replacement.

The difference in chargeability between the toner C and the toner A is larger than the difference in chargeability between the toner B and the toner A. Therefore, in the state in which the toners A and C are mixed, the charge distribution of the toner is significantly polarized as compared with the state in which the toners A and B are mixed, in a manner that fog is likely to occur.

Therefore, as illustrated in FIG. 12, in Example 2, the image formed sheet cumulative number P reaches 600 sheets, and the fog margin exceeds the upper limit value Mth, whereas in Example 4, the image formed sheet cumulative number P reaches 500 sheets, and the fog margin exceeds the upper limit value Mth.

In addition, in Example 2, the maximum value of the fog margin is 180 V, whereas in Example 4, the maximum value of the fog margin reaches 190 V. This is also because the charge distribution of the toner is significantly polarized.

After that, when the switching to the toner C progresses, the polarization of the toner charge distribution is eliminated, and the fog margin returns to 80 V.

Also in this case, as illustrated in FIG. 13, it is possible to continuously suppress fog to a level that there is no problem visually.

(4-8) Example 5

The difference between Example 5 and Example 2 is that the image forming apparatus A according to Example 2 includes the sub-hopper 111, whereas the image forming apparatus B according to Example 5 does not include the sub-hopper 111.

Therefore, in Example 2, the original toner A remains in both the developer 104 and the sub-hopper 111 when the toner bottle 110 is replaced, whereas in Example 5, the original toner A remains only in the developer 104. By this amount, in Example 5, the original toner A is used up quickly and replaced with the new toner B.

Therefore, as illustrated in FIG. 12, in Example 2, the image formed sheet cumulative number P reaches 600 sheets, and the fog margin exceeds the upper limit value Mth, whereas in Example 5, the image formed sheet cumulative number P reaches 500 sheets, and the fog margin exceeds the upper limit value Mth.

After that, when the switching to the toner B progresses, the polarization of the toner charge distribution is eliminated, and the fog margin returns to 80 V. The timing at which the fog margin returns to 80 V is also earlier than that in Example 2.

Even in such a case, as illustrated in FIG. 13, it is possible to continuously suppress fog to a level that there is no problem visually.

(4-9) Example 6

The difference between Example 6 and Example 2 is that the developer 104 and the sub-hopper 111 included in the image forming apparatus C according to Example 6 have larger developer developing agent capacity and sub-hopper capacity than those of the developer 104 and the sub-hopper 111 included in the image forming apparatus A according to Example 2.

Therefore, in Example 6, the supply amount of new toner B required to replace the original toner A with the new toner B is larger than that in Example 2.

As illustrated in FIG. 12, in Example 2, the image formed sheet cumulative number P reaches 600 sheets, and the fog margin exceeds the upper limit value Mth, whereas in Example 6, the image formed sheet cumulative number P reaches 3,000 sheets, and the fog margin exceeds the upper limit value Mth.

After that, when the switching to the toner B progresses, the polarization of the toner charge distribution is eliminated, and the fog margin returns to 80 V. The timing at which the fog margin returns to 80 V is also slower than that in Example 2.

Even in such a case, as illustrated in FIG. 13, it is possible to continuously suppress fog to a level that there is no problem visually.

[5] Modification

Although the present disclosure has been described based on the exemplary embodiments, it is needless to say that the present disclosure is not limited to the above-described exemplary embodiments, and the following modifications can be implemented. (5-1) In a case where fog is detected using the IDC sensor 121, for example, the concentration of the outer peripheral surface (bare surface) of the intermediate transfer belt 105 in a cleaned state is detected in advance, and determination can be made based on whether a difference with the concentration of the fog detection target surface exceeds a threshold value.

When the IDC sensor 121 outputs a voltage corresponding to the concentration, the voltage corresponding to the fog amount F is output. Therefore, the presence or absence of fog may be determined based on whether the difference with the output voltage corresponding to the concentration of the bare surface exceeds a threshold value (for example, 0.1 V and the like). (5-2) In a case where the fog margin is set using the fog margin table such as the normal table or the change table, for example, the fog margin set in the normal table may be within the range of 60 V to 120 V, and the fog margin set in the change table may be within the range of 80 V to 200 V.

It is needless to say that the setting value of the fog margin in the fog margin table is not limited to this, and should be a setting value corresponding to the model of the image forming apparatus 1.

However, the range of the fog margin set in the change table desirably includes the range of the fog margin set in the normal table and is wider than the range of the fog margin set in the normal table. In particular, in order to achieve the object of suppressing fog in a case where the toner charge distribution is polarized, it is desirable that the maximum value of the fog margin set in the change table is larger than the maximum value of the fog margin set in the normal table. (5-3) In the above embodiment, the case where the maximum value of the fog margin when the toner charge distribution is not polarized is set to 120 V has been described as an example, but it is needless to say that the present disclosure is not limited to this, and other values may be adopted instead of 120 V.

Also in this case, it is desirable to set the maximum value of the fog margin when the toner charge distribution is not polarized according to the model of the image forming apparatus 1. (5-4) The first lower limit value, the first upper limit value, the second lower limit value, and the second upper limit value may be, for example, 300 V, 600 V, 200 V, and 800 V. Even in this case, it is desirable to set the first lower limit value, the first upper limit value, the second lower limit value, and the second upper limit value according to the model of the image forming apparatus 1.

In order to achieve the object of suppressing fog in a case where the toner charge distribution is polarized, it is desirable that the second lower limit value is lower than the first lower limit value and the second upper limit value is higher than the first upper limit value. (5-5) The lower limit number P1 and the upper limit number P2 of the image formed sheet cumulative number P can be, for example, 300 sheets and 1,000 sheets.

However, it is needless to say that the present disclosure is not limited to this, and the lower limit number P1 and the upper limit number P2 of the image formed sheet cumulative number P are desirably set according to the developing agent capacity in the developer 104 according to the model of the image forming apparatus 1, the capacity of the sub-hopper 111, and the assumed average CW ratio. (5-6) In the above embodiment, the case where the image formed sheet cumulative number P is used as the value indicating the cumulative value of the toner amount supplied from the toner bottle 110 after the toner bottle 110 is replaced has been described as an example. However, it is needless to say that the present disclosure is not limited to this, and it is as described above that, for example, the cumulative toner supply amount may be used instead of the image formed sheet cumulative number P.

In a case where the cumulative toner supply amount is used, the lower limit amount corresponding to the lower limit number P1 of the image formed sheet cumulative number P may be 3.5 g. In addition, the upper limit amount corresponding to the upper limit number P2 of the image formed sheet cumulative number P may be 110 g.

In addition, in order to acquire the cumulative toner supply amount, the toner supply amount from the toner bottle 110 may be referred to, or may be estimated from the CW ratio of the image to be formed.

It is needless to say that the lower limit amount and the upper limit amount of the cumulative toner supply amount are not limited to the above, and the method of acquiring the cumulative toner supply amount is also not limited to the above. It is desirable to appropriately set both according to model and the like of the image forming apparatus 1.

For example, as the lower limit amount and the upper limit amount of the cumulative toner supply amount, the lower limit amount and the upper limit amount of the cumulative toner supply amount at which fog becomes a problem due to polarization of the toner charge distribution can be used. The lower limit amount and the upper limit amount may be different depending on the developing agent capacity of the developer 104 and the capacity of the sub-hopper 111 in a case where there is the sub-hopper 111. (5-7) In the above embodiment, the case where the image formed sheet cumulative number P is used as the value indicating the toner amount supplied from the toner bottle 110 has been described as an example. However, it is needless to say that the present disclosure is not limited to this, and the toner supply amount from the sub-hopper 111 may be used.

Alternatively, the toner amount necessary for forming the image may be calculated from the image data of the image to be formed, and the cumulative amount may be used as the index value.

The effect can be obtained by applying the present disclosure regardless of what value is used as the value indicating the toner supply amount from the toner bottle 110.

In addition, the toner supply amount from the toner bottle 110 is an index value for determining whether or not the toner supplied from the toner bottle before replacement and the toner supplied from the toner bottle after replacement are mixed in the developer.

Therefore, a value other than the toner supply amount from the toner bottle 110 may be used as long as the value can be used to determine whether or not the toner supplied from the toner bottle before replacement and the toner supplied from the toner bottle after replacement are mixed in the developer. (5-8) In the above embodiment, the case where the fog amount F on the outer peripheral surface of the intermediate transfer belt 105 is detected has been described as an example, but it is needless to say that the present disclosure is not limited to this, and the following may be performed instead.

For example, the fog amount F on the outer peripheral surface of the photoreceptor drum 101 may be detected instead of the intermediate transfer belt 105. In addition, the fog amount F on the image forming surface of the recording medium that carries the toner image may be detected. In this case, the fog amount F may be detected before fixing the toner image on the recording medium in the fixing unit 115, or the fog amount F may be detected after fixing the toner image on the recording medium.

For these detections, an IDC sensor can be used as in the above-described embodiment. In addition, it is needless to say that the fog amount F may be detected using a means other than the IDC sensor. (5-9) The toner used in the image forming apparatus 1 is obtained by dispersing a charge control material, a dye pigment, and the like in a binder resin. The chargeability of the toner may change depending on the type and amount of the charge control agent dispersed in the binder resin.

The toner charging performance also varies depending on the external additive.

Among the external additives, the lubricant is used for the purpose of improving cleaning performance and transferability. As the lubricant, for example, higher fatty acid metal salt particles can be used, but when the content of fatty acid metal salt particles having a volume-based median diameter (volume average particle diameter) with respect to the total amount of the toner exceeds 0.60 mass %, charging between the toner and the carrier is inhibited.

As the external additive, inorganic fine particles, organic fine particles, and the like may be used in combination.

In the case of using two kinds of inorganic fine particles having different number average primary particle diameters (for example, silica particles), when the number average primary particle diameter of the large-diameter particles is 60 to 250 nm, particularly 80 to 200 nm, the adhesion of the large-diameter particles to the toner base particles is promoted, in a manner that the stability of the charge amount is improved.

In addition, when the number average primary particle diameter of the small-diameter particles is 5 to 45 nm, particularly 12 to 40 nm, the chargeability of the small-diameter particles is not good, and the particles easily adhere uniformly on the surface of the toner base particles, in a manner that the stability of the initial charge amount and the charge amount in a high-temperature and high-humidity environment is improved.

In addition, a desired toner charge amount can be obtained by adjusting the mixing ratio of the toner and the carrier.

The binder type carrier is obtained by dispersing magnetic fine particles in a binder resin, and the chargeable fine particles are fixed to the surface of the carrier or a surface coating layer is provided. The charging characteristics of the binder type carrier are controlled by the material of the binder resin, the chargeable fine particles, and the type of the surface coating layer.

The charge level and polarity of the binder type carrier can be adjusted by using organic insulating fine particles as the chargeable fine particles and appropriately selecting the material, polymerization catalyst, surface treatment, and the like.

The binder type carrier can improve the charge imparting ability by forming a surface coating layer obtained by coating a surface with a resin material and curing the resin material.

The coat type carrier is a carrier configured by coating carrier core particles made of a magnetic material with a coating resin. The charging characteristics such as the polarity of the coated carrier can be controlled by the type of the surface coating layer and the type of the chargeable fine particles to be fixed to the surface of the carrier.

As described above, since various methods for adjusting the chargeability of the toner are used, there is a possibility that the chargeability of the toner supplied before and after replacement is changed by replacing the toner bottle 110.

On the other hand, according to the present disclosure, it is possible to determine whether the chargeability of the toner has changed by detecting the fog amount F in a state where the toner is mixed regardless of the type of the toner. (5-10) In the above embodiment, the case where the image forming apparatus 1 is a tandem color printer has been described as an example, but it is needless to say that the present disclosure is not limited to this, and the image forming apparatus 1 may be a color printer other than the tandem type, or may be a monochrome printer.

In addition, the image forming apparatus 1 may be a copy apparatus including a scanner, or may be a facsimile apparatus having a facsimile communication function. In addition, the image forming apparatus 1 may be a multi-function peripheral (MFP) having these functions.

In addition, in the above embodiment, the case where the image forming apparatus 1 includes the sub-hopper 111 has been described as an example, but it is needless to say that the present disclosure is not limited to this, and the toner may be directly supplied from the toner bottle 110 to the developer 104 without including the sub-hopper.

In addition, the developing agent used by the image forming apparatus 1 may be a one-component developing agent or a two-component developing agent. In a case where the two-component developing agent is used, the toner bottle 110 may contain both the toner and the carrier, or may contain only the toner. The toner bottle 110 containing both the toner and the carrier is used in a case where the developer 104 is a so-called trickle type.

In any case, by applying the present disclosure, it is possible to detect an increase in the fog amount F due to the fact that toners having different chargeability are mixed and the toner charge distribution is polarized. When it is determined that the chargeability of the toner has changed after the toner bottle 110 is replaced by detecting the fog amount F in this manner, the fog margin can be appropriately set, in a manner that occurrence of fog can be prevented. (5-11) In the above embodiment, the present disclosure has been described by taking the image forming apparatus 1 as an example, but it is needless to say that the present disclosure is not limited to this, and the present disclosure may be a determination method of determining whether or not the chargeability of the toner has changed before and after replacement of the toner bottle.

In addition, the present disclosure may be a determination program that causes the image forming apparatus 1 to use the determination method according to the present disclosure, or may be a recording medium in which the determination program according to the present disclosure is recorded.

In any case, the effect can be obtained by applying the present disclosure.

The image forming apparatus according to the present disclosure is useful as an apparatus capable of detecting a change in toner charging characteristics before and after replacement of a toner bottle.

Although embodiments of the present invention have been described and illustrated in detail, the disclosed embodiments are made for purposes of illustration and example only and not limitation. The scope of the present invention should be interpreted by terms of the appended claims

What is claimed is:

1. An electrophotographic image forming apparatus comprising:

a replacement detector that detects that a toner bottle has been replaced;

a developer that develops an electrostatic latent image by using a toner supplied from the toner bottle and stored;

a fog detector that detects a fog amount; and a determiner that determines whether or not the detected fog amount continuously exceeds a predetermined threshold fog amount value in a state where a toner supplied from a toner bottle before replacement and a toner supplied from a toner bottle after replacement are mixed in the developer by determining whether or not a number of consecutive times that the detected fog amount exceeds the predetermined threshold fog amount value is greater than a predetermined count value.

2. The image forming apparatus according to claim 1, wherein the determiner determines whether a charging characteristic of the toner has changed by determining whether the detected fog amount continuously exceeds the predetermined threshold fog amount value.

3. The image forming apparatus according to claim 2, wherein the determiner performs the determination as a state in which toners are mixed in the developer in a case where a cumulative amount of the toner supplied after replacement of the toner bottle is within a predetermined range.

4. The image forming apparatus according to claim 3, comprising:

a fog margin changer that changes a fog margin according to the cumulative amount of the toner supplied after replacement of the toner bottle in a case where the determiner determines that chargeability of the toner has changed.

5. The image forming apparatus according to claim 4, wherein the fog margin changer sets a fog margin regardless of the cumulative amount of the toner supplied after replacement of the toner bottle in a case where the cumulative amount of the toner supplied after replacement of the toner bottle exceeds a predetermined amount exceeding a predetermined range after the determiner determines that chargeability of the toner has changed.

6. The image forming apparatus according to claim 5, wherein the predetermined amount exceeding a predetermined range is three times or more an amount of a toner stored in a toner supply path from the time when the toner is supplied from the toner bottle to the time when the toner is supplied to a surface of a photoreceptor.

7. The image forming apparatus according to claim 3, comprising:

a fog margin setter that sets a fog margin that does not exceed a predetermined upper limit value among fog margins in which a fog amount does not exceed a predetermined threshold value by detecting a fog amount for each fog margin, wherein the fog margin setter increases the predetermined upper limit value in a case where chargeability of the toner is determined to have been changed.

8. The image forming apparatus according to claim 7, wherein the fog margin setter returns the predetermined upper limit value to an original value in a case where the cumulative amount of the toner supplied after replacement of the toner bottle exceeds a predetermined amount exceeding the predetermined range after the determiner determines that chargeability of the toner has changed.

9. The image forming apparatus according to claim 7, wherein in a case where the cumulative amount of the toner supplied after replacement of the toner bottle exceeds a predetermined amount exceeding a predetermined range after the determiner determines that chargeability of the toner has changed, the fog margin setter includes a development potential acquisitor that acquires a development potential capable of forming an image with a predetermined concentration, and a target value changer that changes a target value of a toner concentration in the developer to be higher than a target value when the development potential is acquired in a case where the acquired development potential is higher than a predetermined upper limit potential.

10. The image forming apparatus according to claim 7, wherein in a case where the cumulative amount of the toner supplied after replacement of the toner bottle exceeds a predetermined amount exceeding a predetermined range after the determiner determines that chargeability of the toner has changed, the fog margin setter includes a development potential acquisitor that acquires a development potential capable of forming an image with a predetermined concentration, and a target value changer that changes a target value of a toner concentration in the developer to be lower than a target value when the development potential is acquired in a case where the acquired development potential is lower than a predetermined lower limit potential.

11. The image forming apparatus according to claim 3, wherein the determiner uses a number of images formed after replacement of the toner bottle as the cumulative amount of the toner supplied after replacement of the toner bottle.

12. The image forming apparatus according to claim 3, wherein the determiner includes a supply amount measurer that measures an amount of the toner supplied from the toner bottle.

13. The image forming apparatus according to claim 3, comprising:

a sub-hopper that stores the toner supplied from the toner bottle and supplies the stored toner to the developer on a toner supply path from the toner bottle to the developer; and a supply amount measurer that measures an amount of a toner supplied from the sub-hopper, wherein the determiner uses a cumulative toner amount supplied from the sub-hopper after replacement of the toner bottle as the cumulative amount of the toner supplied after replacement of the toner bottle.

14. The image forming apparatus according to claim 3, wherein a predetermined range of the cumulative amount of the toner supplied after replacement of the toner bottle is in a range of 0.1 to 2.5 times an amount of a toner stored in a toner supply path from the time when the toner is supplied from the toner bottle to the time when the toner is supplied to a surface of a photoreceptor.

15. The image forming apparatus according to claim 2, wherein the determiner determines whether the charging characteristic of the toner has changed by determining whether the fog amount exceeds the predetermined threshold fog amount value a plurality of consecutive times as a result of repeatedly detecting a fog amount.

16. The image forming apparatus according to claim 2, wherein the fog detector detects a fog amount from an image density of a non-image portion on a surface of a photoreceptor carrying a toner image.

17. The image forming apparatus having an intermediate transfer system according to claim 2, wherein the fog detector detects a fog amount from an image density of a non-image portion on a surface of an intermediate transfer body to which a toner image has been primarily transferred.

18. The image forming apparatus according to claim 2, wherein the fog detector detects a fog amount from an image density of a non-image portion on an image forming surface of a recording medium carrying a toner image.

19. The image forming apparatus according to claim 2, comprising:

a sub-hopper that stores the toner supplied from the toner bottle and supplies the stored toner to the developer on a toner supply path from the toner bottle to the developer.

20. A determination method that determines whether chargeability of a toner has changed in an electrophotographic image forming apparatus, the determination method comprising:

detecting that a toner bottle has been replaced;

developing an electrostatic latent image by using a toner supplied from the toner bottle and stored in a developer;

detecting a fog amount; and determining that the chargeability of the toner has changed when the detected fog amount continuously exceeds a predetermined threshold fog amount value in a state where a toner supplied from a toner bottle before replacement and a toner supplied from a toner bottle after replacement are mixed in the developer by determining whether or not a number of consecutive times that the detected fog amount exceeds the predetermined threshold fog amount value is greater than a predetermined count value.

* * * * *